US012675996B2

(12) United States Patent
Meier

(10) Patent No.: US 12,675,996 B2
(45) Date of Patent: Jul. 7, 2026

(54) SYSTEMS AND METHODS FOR GENERATING COMPOSITE MEDIA USING DISTRIBUTED NETWORKS

(71) Applicant: Philip Martin Meier, La Jolla, CA (US)

(72) Inventor: Philip Martin Meier, La Jolla, CA (US)

(73) Assignee: Philip Martin Meier, La Jolla, CA (US)

( * ) Notice: Subject to any disclaimer, the term of this patent is extended or adjusted under 35 U.S.C. 154(b) by 0 days.

(21) Appl. No.: 18/773,436

(22) Filed: Jul. 15, 2024

(65) Prior Publication Data

US 2024/0371161 A1     Nov. 7, 2024

Related U.S. Application Data

(63) Continuation of application No. 18/311,658, filed on May 3, 2023, now Pat. No. 12,056,927, which is a (Continued)

(51) Int. Cl.
| | |
|---|---|
| *G06T 7/246* | (2017.01) |
| *G06V 20/40* | (2022.01) |
| *G10L 21/10* | (2013.01) |

(52) U.S. Cl.
CPC .............. *G06V 20/41* (2022.01); *G06T 7/246* (2017.01); *G06V 20/46* (2022.01); *G10L 21/10* (2013.01);

(Continued)

(58) Field of Classification Search
None
See application file for complete search history.

(56) References Cited

U.S. PATENT DOCUMENTS

| | | | |
|---|---|---|---|
| 8,132,203 B2 * | 3/2012 | de Heer | H04N 21/4722 |
| | | | 725/35 |
| 9,159,364 B1 * | 10/2015 | Matias | G11B 27/28 |

(Continued)

OTHER PUBLICATIONS

Notice of Allowance for U.S. Appl. No. 16/432,865 dated Nov. 23, 2020.

(Continued)

*Primary Examiner* — Tsung Yin Tsai
(74) *Attorney, Agent, or Firm* — Mughal Gaudry & Franklin PC

(57) ABSTRACT

A distributed systems and methods for generating composite media including receiving a media context that defines media that is to be generated, the media context including: a definition of a sequence of media segment specifications and, an identification of a set of remote devices. For each media segment specification, a reference segment may be generated and transmitted to at least one remote device. A media segment may be received from each of the remote device, the media segment having been recorded by a camera. Verified media sequences may replace the corresponding reference segment. The media segments may be aggregated and an updated sequence of media segments may be defined. An instance of the media context that includes a subset of the updated sequence of media segments may then be generated.

20 Claims, 11 Drawing Sheets

Related U.S. Application Data continuation of application No. 17/182,854, filed on Feb. 23, 2021, now Pat. No. 11,676,382, which is a continuation of application No. 16/432,865, filed on Jun. 5, 2019, now Pat. No. 10,963,697.

(60) Provisional application No. 62/680,916, filed on Jun. 5, 2018.

(52) U.S. Cl.
CPC ............... *G06T 2207/10016* (2013.01); *G10L 2021/105* (2013.01)

(56) References Cited

U.S. PATENT DOCUMENTS

| | | | | |
|---|---|---|---|---|
| 9,436,875 | B2 * | 9/2016 | Curcio | .................... G06V 20/46 |
| 10,096,341 | B2 | 10/2018 | Sievert et al. | |
| 10,679,063 | B2 | 6/2020 | Cheng et al. | |
| 10,713,537 | B2 | 7/2020 | Heide et al. | |
| 10,915,647 | B2 | 2/2021 | Racz et al. | |
| 11,676,382 | B2 | 6/2023 | Meier | |
| 2002/0140719 | A1 * | 10/2002 | Amir | .................. H04N 21/8549 |
| | | | | 707/E17.009 |
| 2006/0184980 | A1 * | 8/2006 | Cole | .................... G11B 27/034 |
| | | | | 725/100 |
| 2007/0079325 | A1 | 4/2007 | De Heer | |
| 2014/0161354 | A1 * | 6/2014 | Curcio | .................. G06V 20/41 |
| | | | | 382/190 |
| 2014/0328570 | A1 * | 11/2014 | Cheng | ..................... G06F 16/43 |
| | | | | 386/241 |
| 2015/0100578 | A1 * | 4/2015 | Rosen | ................... G06F 16/907 |
| | | | | 707/737 |
| 2016/0004911 | A1 * | 1/2016 | Cheng | .................. H04N 21/233 |
| | | | | 382/159 |
| 2016/0014482 | A1 * | 1/2016 | Chen | .................. H04N 21/8456 |
| | | | | 386/241 |
| 2016/0197993 | A1 * | 7/2016 | Perkowski | .............. H04L 67/02 |
| | | | | 709/203 |
| 2016/0225187 | A1 * | 8/2016 | Knipp | ................... G06F 40/131 |
| 2017/0263288 | A1 | 9/2017 | Sievert et al. | |
| 2018/0204111 | A1 * | 7/2018 | Zadeh | .................... G06N 3/088 |
| 2018/0330112 | A1 | 11/2018 | Racz et al. | |
| 2019/0014363 | A1 | 1/2019 | Skupin et al. | |
| 2019/0114485 | A1 * | 4/2019 | Chan | .................. H04N 21/4662 |
| 2019/0213254 | A1 * | 7/2019 | Ray | .......................... G06N 7/01 |
| 2019/0370554 | A1 * | 12/2019 | Meier | ............... H04N 21/6582 |
| 2021/0182559 | A1 * | 6/2021 | Meier | .................... G10L 21/10 |
| 2024/0233228 | A1 * | 7/2024 | Petkov | ................... G06T 13/20 |

OTHER PUBLICATIONS

Notice of Allowance for U.S. Appl. No. 17/182,854, dated Feb. 10, 2023.

Notice of Allowance for U.S. Appl. No. 18/311,658, dated Mar. 27, 2024.

Office Action for U.S. Appl. No. 17/182,854, dated Nov. 9, 2022.

Office Action for U.S. Appl. No. 18/311,658, dated Jan. 8, 2024.

* cited by examiner

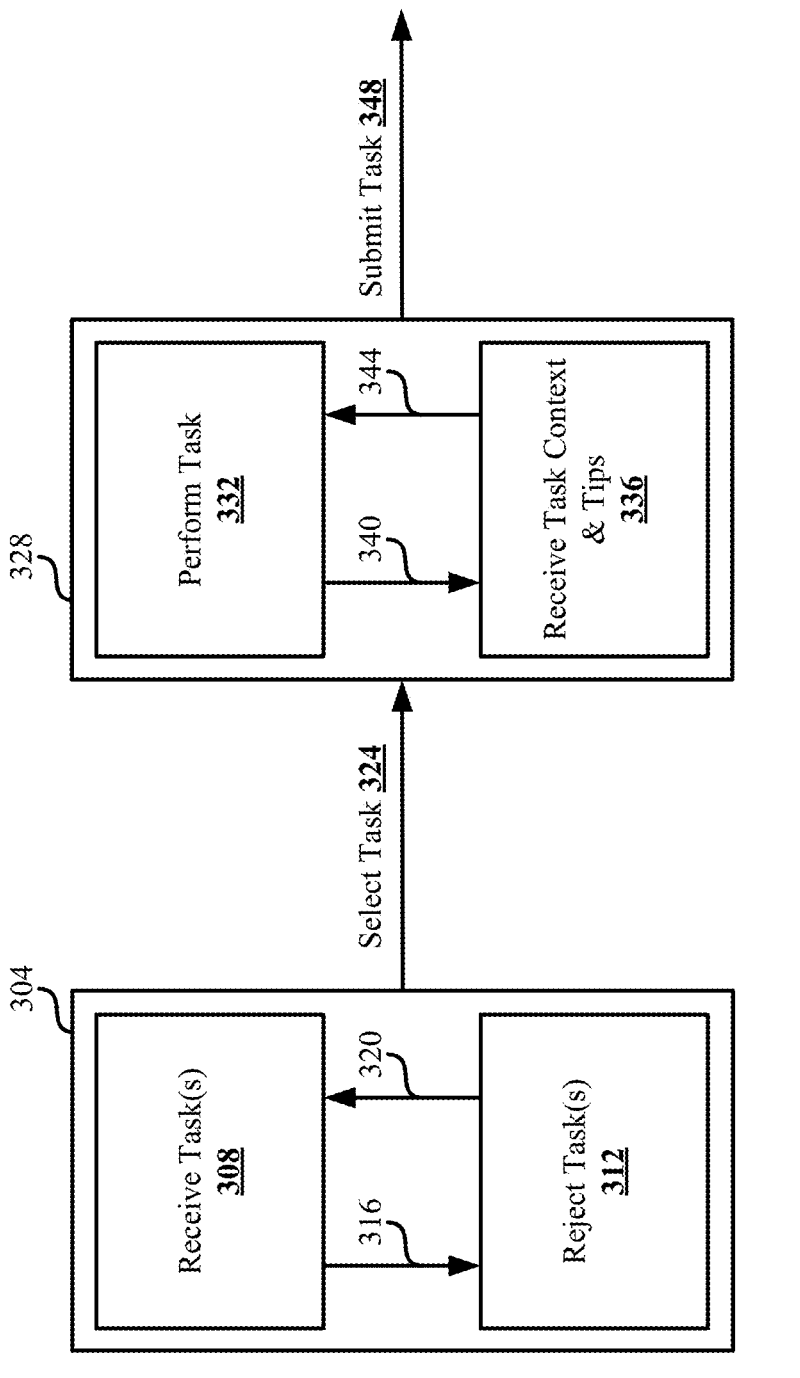
Submit Task 348
328
Perform Task 332
344
Receive Task Context & Tips 336
340
Select Task 324
304
Receive Task(s) 308
320
Reject Task(s) 312
316
FIG. 3
300

Preview Clip Task

404

472

468

456

460

464

408

Focus

476

480

412

484    Close up of Focal Point?    488

1 Sec

Next
492

Temporal
Context

404

428

424

436

420

416

432

Perform Clip Task

Overlay

408

Focus

440

Instruction

412

444    Add light from left?

Redo
448

Next
452

Figure 9:
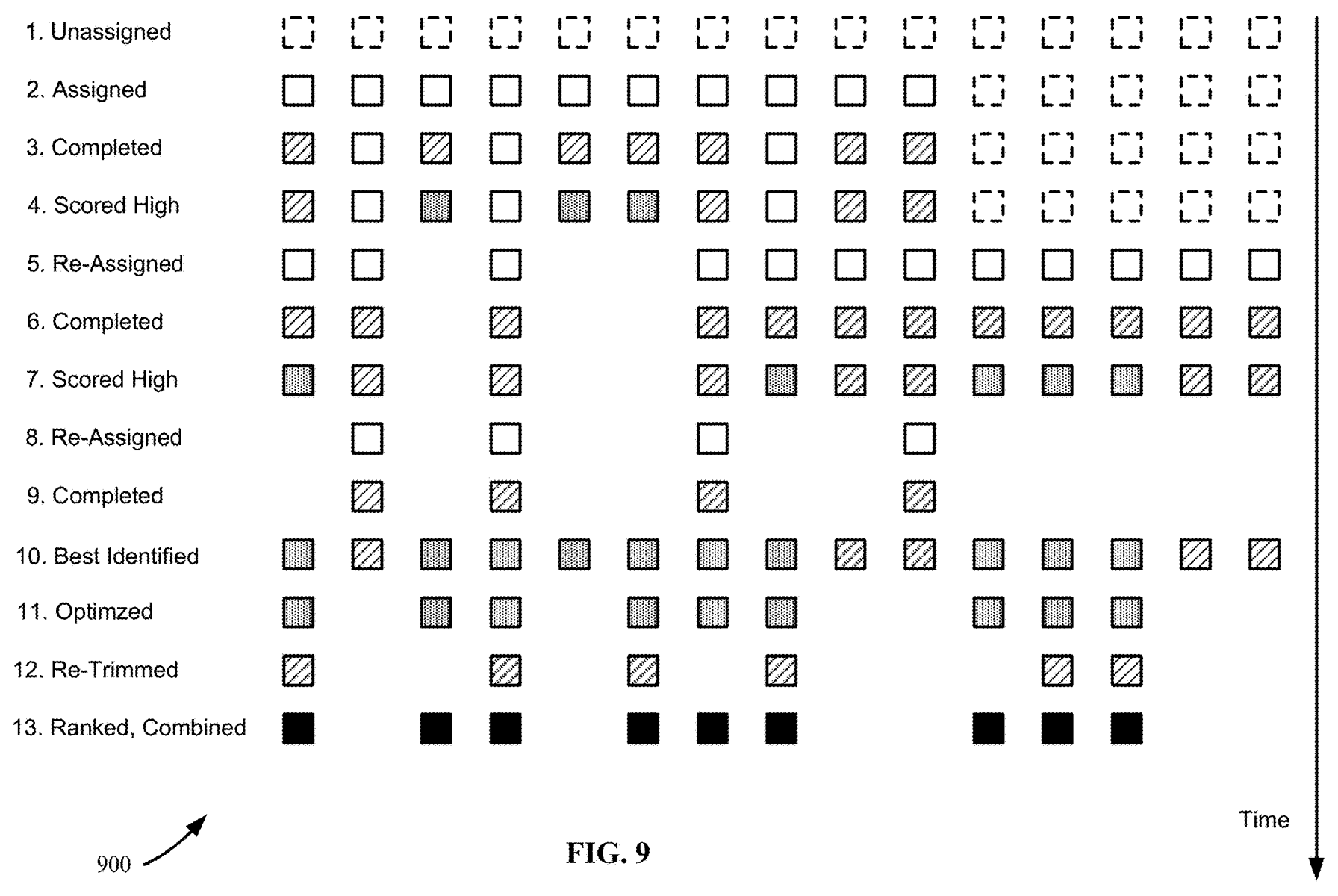

1. Unassigned
2. Assigned
3. Completed
4. Scored High
5. Re-Assigned
6. Completed
7. Scored High
8. Re-Assigned
9. Completed
10. Best Identified
11. Optimzed
12. Re-Trimmed
13. Ranked, Combined Time

900

SYSTEMS AND METHODS FOR GENERATING COMPOSITE MEDIA USING DISTRIBUTED NETWORKS

CROSS-REFERENCED TO RELATED APPLICATIONS

This application is a continuation of U.S. patent application Ser. No. 18/311,658, filed May 3, 2023, which is a continuation of U.S. patent application Ser. No. 17/182,854, filed Feb. 23, 2021, which is a continuation of U.S. patent application Ser. No. 16/432,865 filed Jun. 5, 2019, now U.S. Pat. No. 10,963,697, issued Mar. 30, 2021, which claims the benefit of and priority to U.S. Provisional Application No. 62/680,916, filed on Jun. 5, 2018. Each of these applications is hereby incorporated by reference in its entirety for all purposes.

FIELD

The present disclosure relates generally to generating composite media from distributed devices. More particularly, the present disclosure relates to generating composite media from aggregated distributed segments using an AI processor.

BACKGROUND

Generating coherent media from disparate and distributed sources can be difficult and expensive. Generally, media can be obtained from devices and sent to a central location where an editor reviews the media frame-by-frame. Editors use specialized hardware to review one or more sets of frames simultaneously and manipulates frames or whole scenes so that the composite set of frames appears as coherent media. Since editors are separate for the individuals who filmed a particular scene, the editor cannot simply re-shoot a set of frames or scenes once a particular set of frames or scenes does not correspond to other frames or scenes. In some instances, directors may order a particular scene to be filmed multiple times in different ways to give the editor some flexibility when generating the composite media. However, often the director does not know what particular scenes or frames need to be modified or how. Further editors must then sift through thousands of hours of media just generate a two-hour composite media.

SUMMARY

A method is disclosed for generating composite media using distributed device network, the method including: receiving a media context that defines media that is to be generated, the media context including a definition of a sequence of media segment specifications and an identification of a set of remote devices. For each media segment specification of the sequence of media segment specifications, operations can be performed including: generating, using the media context, a reference segment, the reference segment being a temporary representation of the media segment; transmitting the reference segment to at least one remote device of the set of remote devices; receiving, from each of the at least one remote devices of the set of remote devices, a media segment based on the reference segment, each media segment having been recorded using a camera associated with the at least one remote device of the set of remote devices; verifying the media segment; and replacing, based on verifying the media segment, the reference segment with the media segment. the method further including: aggregating each media segment to form a sequence of media segments; defining an updated sequence of media segments using the aggregated media segments; and generating an instance of the media context that includes a subset of the updated sequence of media segments.

In some instances, a system may be provided that includes one or more processors and a non-transitory computer-readable medium including instructions which, when executed on the one or more processors, cause the one or more processors to perform part or all of methods disclosed herein.

In some instances, a non-transitory machine-readable medium and that includes instructions which, when executed on the one or more processors, cause the one or more processors to perform part or all of methods disclosed herein.

BRIEF DESCRIPTION OF THE DRAWINGS

FIG. 3 is a diagram of interfaces that receives and executes audiovisual tasks according to at least one aspect of the disclosure.

FIG. 9 is a block diagram of distributed task processing system according to at least one aspect of the disclosure.

DETAILED DESCRIPTION

Figure 1:
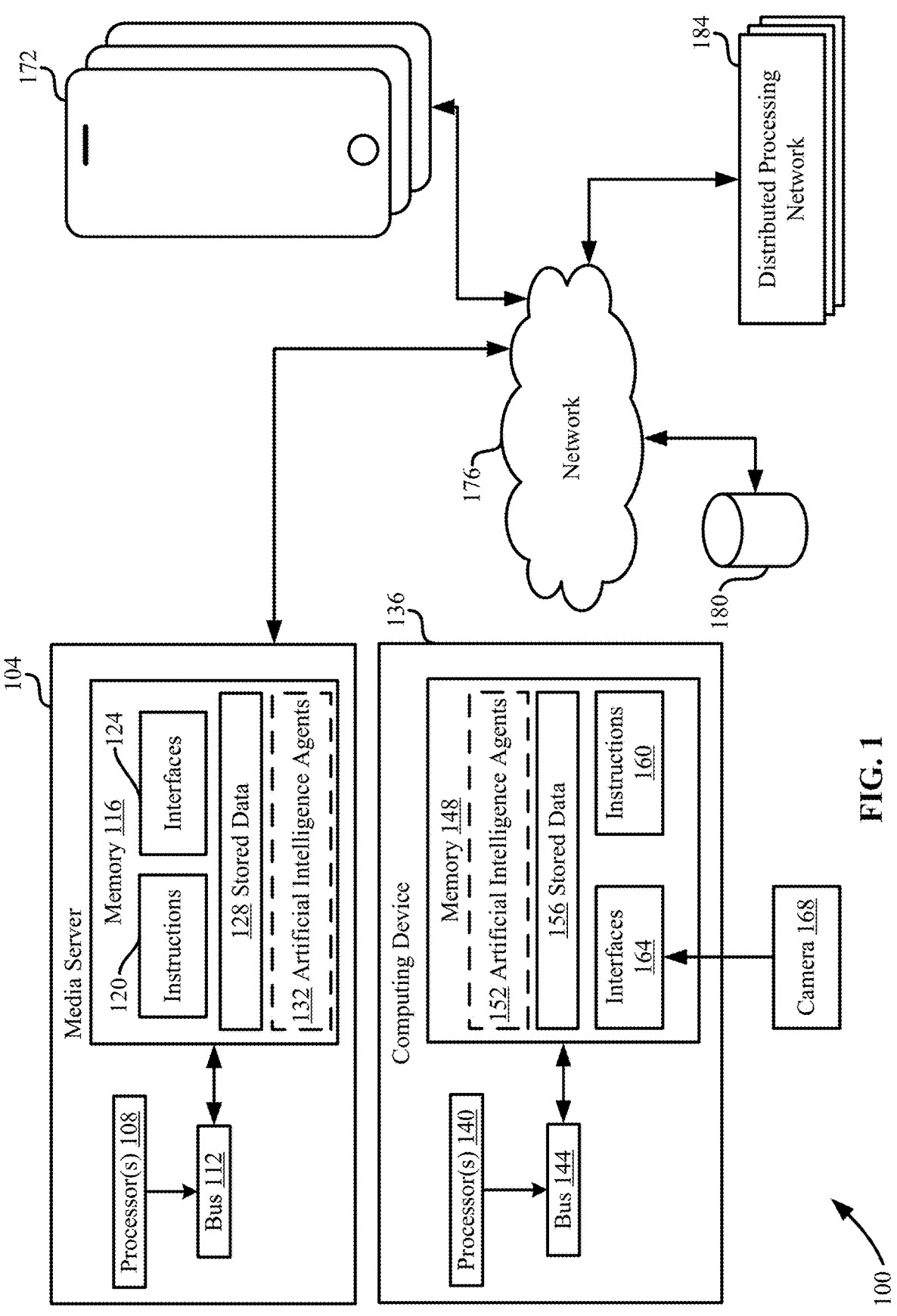
FIG. 1 is a block diagram of distributed system for composite media generation according to at least one aspect of the disclosure.

Certain aspects and features relate to composite-media generators that dynamically adapts to user contexts, educates users iteratively to achieve aesthetic criteria, provides a common interface for media review, provides proactive suggestions about narrative improvements, detects the contents of user generated media, and detects the relationships between clips. Composite-media generators can be a system of hardware and software components that include cameras configured to obtain one or more frames of media, one or more processors for executing software instructions to direct user collaboration with media generation, and one or more artificial-intelligence processors that process user generated media and provide context aware information and create clips that correspond to user generated content. As used herein, a clip can be, but is not limited to, a set of frames of media. Media can include images, video, audio, combinations thereof, or the like. The systems and methods generate templates that adapt to a users' context.

In some instances, generated storyboards (e.g., instructions that generate a clip or scene) can be modified by suggesting transforms based on users' contexts detected from previously generated clip(s) or the generated storyboards. Examples of transforms can include, but are not limited to, the addition of new clip(s), the rearrangement of one or more previous clip(s), the trimming of one or more previous clips, the re-ordering of scenes (e.g., a set of clip(s)), the proposal of new scene(s), one or more audiovisual filter(s), executing one or more image or pixel processing functions on one or more clip(s), combinations thereof, and the like.

For instance, first clip of video generated by a person traveling on a train may be expanded by one or more clip(s) that contextually correspond to travel videos. The one or more clip(s) may include clip(s) associated with travel narratives that best fit the users' existing content, types of clip(s) the user is likely to complete, etc. The composite-media generators may be iterative, context aware, and configured to build the best media in collaboration with the user. For instance, composite-media generators can sample the users' context through processing media generated by the user, inferring candidate user intent from the processed media, and use one or more interfaces for multi-parameter video editing that are able to assign a quality metric and track quality metrics across all of the clip(s) of composite media.

Composite-media generators can reduce narrative domain expertise into a system of instructions that can enable a content creator to receive "expert advice" from multiple disparate sources. For instance, the multiple sources may be received from multiple "contributor" devices or from software, such as artificial intelligence, executing on the content creator's device or on any of one or remote devices. The software may be trained to define aesthetic judgements, communicative intent, or various forms of digitally encoded quality metrics. In some instances, the "advice" may direct the content creator to transform or generate media. In other instances, the "advice" may include software that autonomously transforms or generates media according to one or more quality metrics, which may be presented to content creator. In other words, the "advice" may include feedback to the content creator or camera operator that is immediate, software-defined, and context-aware. Composite-media generators may use one or more interfaces that combine overlapping visual information that augments raw clips with intuitive instructions to improve one or more aspects of a clip. For instance, the instructions may indicate changes to one or more of capture quality, lighting, framing, movements, content selection, combinations thereof, or the like.

Composite-media generators may use partial media (e.g., a little as a single frame) to identify candidate narratives. The candidate narratives may be used to recommend subsequent media collection. New content can be generated that is aligned with particular partial narrative that is associated with a user's intent. The systems and methods described herein parse content through one or more of: (1) analysis of media and its context, (2) relation to a storyboard, (3) relation to a label supplied by a user, (4) similarity to other media which specifies content in another means, such as a picture, audio, text, or the like.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a block diagram of distributed system 100 for composite media generation according to at least one aspect of the disclosure. System 100 may include one or more media servers 104 that operate alone or as part of a cloud service to direct the generation of composite media. Composite media may include, but is not limited to, one or more images, video of any length, and/or audio that is stitched together from two or more media segments. Media server 104 may include one or more processors 108 connected to memory 116 through a bus 112. Memory 116 may include instructions 120 that execute on processors 108 and interfaces 124 for communicating with one or more remote devices such as computing device 136, mobile devices 172 and distributed processing network 184. Media server 104 may communicate with other devices, databases, and networks of system 100 through network 176. Network 176 may be any type of network including, but not limited to, a cloud network, local area network, wide area network, Wi-Fi network, or the like.

Memory 116 may also include stored data artificial intelligence agents 132. Stored data may include one or more templates from generating previous composite media, previously generated composite media, media segments, labeled media segments (e.g., training data for the artificial intelligence agents), style data, color data, transformations processes, and the like. Artificial intelligence agents 132 may provide additional processing in generating composite media. For instance, artificial intelligent agents 132 may use a reference image or media segment to direct other computing devices to record additional media segments or may piece together other media segments of other data in stored data 128. Artificial intelligent agents 132 may execute one or more transformation on media segments to improve the coherence with other media segments. For instance, artificial intelligent agents 132 may stabilize jitter, provide smoothing, and increase/decrease a resolution, pan, trim, change color pallets, or the like.

Artificial intelligence agents 132 or 148 can include, for example, a regression model (e.g., linear-regression model or logistic-regression model), a discriminant-analysis model (e.g., linear discriminant analysis model), a decision-tree model (e.g., using a classification tree or regression tree), a Naïve Bayes model, a nearest-neighbor model (e.g., using a K-Nearest Neighbors algorithm or K-means algorithm), a neural-network model (e.g., using a Learning Vector Quantization algorithm, feed forward network, deep neural network, recurrent neural network, neural network with one or more memory cells and/or deconvolutional network), a feature-transformation technique (e.g., using principal component analysis or independent component analysis), a support vector machine, a Random-Forest model, a model learned using Shannon entropy (e.g., by measuring entropy during Bayesian learning or decision-tree learning and/or by representing a loss function using cross entropies across two, more or all data sets), an ensemble model, convolutional neural networks, recurrent neural networks, deep boltzmann machines, and deep belief networks, stacked denoising autoencoders, long short-term memory (LSTM), or the like.

The processes of AI agents may use a shared or common format such as a function that maps an input to an action. The functions may be written as rule based software, trained by decisions of an expert such as a user or another trained AI agent. The functions may also be approximated from labels (e.g., past action that was executed from a given set of inputs). The input data for a function can be media and/or a context. The media may include an image, set of images, video, audio, a hierarchical component of a storyboard, combinations thereof, and the like. The context may be specific, intermediate, or general. A specific context includes a specific instance of a media request (such as all remakes of a single media segment from a reference composite media, as specification in the user interface). An intermediate context may include every media segment that corresponds to particular style as appropriate to a desired look and feel. A general context may be established by similarity such as a set of images that are all close-ups of a same face. The output format of the function may be a media action of a particular type and including parameters.

For example, the media action type may be a "soft focus" with the parameters being a Gaussian width, an applitude, and a spline that tracks a face. For instance, an input may be a media segment of two people on a beach, the function can estimate that a soft focus should be applied to the closer person who may be smiling. In some instances, the AI agent may provide all the parameters in an output vector. In other instances, a modular system may execute, conditioned on a type "soft focus", to generate the parameters required to apply this media transform.

The functions may approximate learn from past mappings of media to action. In addition, the past media actions of previous media transforms may be weighted to carry more strength for building a mapping. A past media action may be weighted based on: 1) whether the past media action was verified to yield a positive outcome, 2) whether the past media action was performed by a user with a historical track record of performance or high trust level for quality work, 3) whether the past media action was applied to data that shared a similar context to the inputs, combinations thereof, or the like.

Data may be pooled from "similar contexts." These similar context may be defined by similar creators, similar watchers, similar content type, a clustering algorithm that groups similar data together, combinations thereof and the like. The larger the pool of data, the more likely that each unique context can be mapped to a set of inputs. For example, the dot product of the statistic of a mid-layer of a convolutional neural network may be used to identify similarity of content between media segments. Another approach can be to use an embedding in a similarity space.

AI agents 132 may be configured to execute the same tasks as users operating computing devices 104, 136, or 172. Examples of tasks that may be executed by an AI agent include, but are not limited to, labeling media segments, classifying events, defining high quality regions of a media segment, classify aesthetic properties, synching media segments and audio according to pace or changes in pace, identifying or selecting a best media segment, overlay media on a three dimensional representation, combinations thereof, or the like. For instance, an AI agent such as a convolutional neural network or Mask R-CNN may replace a user in labeling media segments. The AI agent may assign temporal labels media segment that identify an action depicted by the media segment. The AI agent may identify a most significant frame that represents an action of interest an analyze that frame to identify the temporal label.

AI agents may classify events associated with media segments by defining discrete event types and labeling the media segments according to an event type. For instances, the event may be a character that is performing a particular action such has walking, jumping, smiling, gesturing, interacting with an object, body translation, reorientation of attention or the like. AI agents may defining high quality regions of a media segment by convolving space-time kernels (or aggregating over convolutional neural network image representations), detecting good, bad, and transitions zones, detecting trim given the good, bad, and transition zones. AI agents that identify high quality regions may be, but are not limited to neural networks, long short term memories, recurrent neural networks, or the like.

For instance, a preprocessing stage can generate a time-varying vector for good traits of a media segment or frame and another time varying vector for bad traits. For example, good traits may include relevant human actions such as smiles, expressions, gestures, entering, exiting, talking, and the like. Frames or media segments that include good traits may be marked or annotated to reflect the inclusion of a good trait such as using "include" or marked with an indication of the particular one or more good traits that are included. Bad traits may include blur, clutter, unstable cameras, frame jitter, boring inactivity, long boring repetitive clips, or the like. Frames or media segments that include good traits may be marked or annotated to reflect the inclusion of a bad trait such as using "exclude" or an indication of the particular one or more bad traits that are included. A context can convolve over a moving predetermined time interval (i.e. a moving time window) over the good and bad vector. The context may weight the relative importance of good traits and bad traits that may be identified in the portion of the media segment within the time interval, sum the weights. The portion of the media segment that corresponds to the time interval with the peak (e.g. largest sum) may be selected as the highest quality region of the media segment. In some instances, the input features may be the responses received from other AI agents such as convolutional neural networks that were previously trained to detect classes of events. In other instances, a new AI agent could be trained starting with raw pixel data to minimize "error" in trim locations (e.g. deviations from an expert with a given aesthetic criteria).

Some of the various inputs that define or are included within a task, media segment specification, storyboard, or process of composite media generation may be used in subsequent labeled learning (e.g., supervised learning). Such inputs may include, for example, linear transforms of an image; biologically inspired transforms mimicking the front end of a mammalian visual system such as, but not limited to the retina, visual thalamus, primary visual cortex, or the like; normalization procedures such as luminance normalization, contrast normalization and other features that may be divisively normalized; combinations thereof and the like. A processing node of an AI agent, such as neural network or the like, within a network of nodes may represent an activation event as an analog value, a binary activation state, a probability, a belief distribution, a discrete state on N possibilities, a point process over time, or any representation appropriate to the supervised learning algorithm employed.

A standard framework for generating sets of images and associated media segment features to train AI agents (including estimators of the media segment features) may be provided. The framework may employ pixel aligned feature maps that may compare the visual support in the image to predicted features. The feature maps may include images of logical values evaluated at every spatial location. Learning samples may be selected according to a criterion, such as matching the number of positive and negative exemplars, maintaining the relative frequency of features, etc. For this reason, not every "pixel" in an image may be used to update a learning sample. In some instances, at least some off the pixels may be used to drive the context that activates supervised learning. The features of the context will be learned if the features help to estimate the current media segment feature being trained.

A target feature sensitivity and spatial invariance may be defined by a designer using a training signal for a particular media segment feature. Analog values may be encoded as a range (such as between thirty and thirty-two degrees), defined by sensitivity per feature, tiling density of the parameter, combinations thereof, and the like. The feature values for the learning sample may be binary, and in some instances, the feature values may also be deterministic or stochastic. In some instances, a range of values may by encoded by a kernel such as Gaussian with a peak amplitude of one, a boxcar with cosine rounded edges, and the like. The spatial invariance may be encoded using one or more rules. Examples of the forms of such rules may include, but are not limited to "if at least one pixel with radius R has property X", "if at least fraction F of the pixels within radius R have property X", and the like.

Computing device 136 may include one or more processors 140 and one or more memories 148 connected to bus 144. Memory 148 may include instructions 160 that execute on processor(s) 140 to perform operations of the computing device including directing the generation of composite media. For instance, computing device may define a communicative intent and roles for one or more devices for a composite media. The narrative intent and roles may be used to define a storyboard, which describes a sequence of media segments. Instructions 160 may use data from media server 104 to identify mobile device 172 or stored media segments in database 180. Instructions 160 may define tasks from the storyboard that direct mobile devices 172 to record each media segment (or a portion of thereof). Tasks can include recording a media segment, editing a media segment, rating a media segment for quality, verifying a media segment corresponds or the storyboard, labeling a frame or video segment, and the like. The media segments, once recorded, may be transmitted to computing device 136, media server 104, database 180, or to distributed processing network 184, where the media segments may be transformed and aggregated into composite media.

In some instances, a generative adversarial network may be used to generate models of media transforms. Generative adversarial network generate two models: a first model that approximates the media transforms created by a source (such as an expert user or another AI agent) and the second model may be trained to discriminate between the first model and the source. The two models act antagonistically to extract richer features of the visual media. The approximated media transforms of the first model may become less and less distinguishable from the source (second model) as more responses of the generative adversarial network including the output of media transform types and associated parameters are processed.

In some instances, a user may take a picture or video with camera 168 or record audio (not shown). Instructions 160 or artificial intelligence agents 152 may present the user of computing device 136 with narrative templates. The user may select a template and instructions 160 may then define a storyboard around the picture, video or record audio. For instance, the user may have taken a picture of a beach. The instructions may define storyboard that directs the user to record video of the parking lot, waves, people coming and going, an umbrella, or the like. Once the media segments are recorded, instructions 160 aggregate the media segments, provide any transformation to ensure the media segments can be integrated seamlessly, and direct that addition of any audio, such as dialog, voice over, music, or the like. Alternatively, a network of media segment creators, evaluators, and editors may be assigned tasks corresponding to creating any narrative defined by computing device 136.

Artificial intelligence agents 152 may be the same type of artificial intelligence as artificial intelligence agents 132. In some instances, artificial intelligence agents 152, may perform the same functions as artificial intelligence agents 132. In other instances, artificial intelligence agents 152 may be received from media server 104 and be a limited or reduced version of artificial intelligence agents 132.

In some instances, computing device may be a mobile device such has mobile device 172. Alternatively, computing device 136 may be desktop or laptop computer. Distributed processing network 184 may include one or more expandable nodes that execute some or all of the tasks of system 100. Distributed processing network 184 may receive a specification that indicate a number of nodes to allocate for a particular task. Distributed processing network 184 may be used to scale processing of any number of media segment or composite media tasks to reduce the amount of processing time to generate composite media. Database 180 may store media segments generated from other devices. In some instances, database 180 may additionally store templates, storyboards, or the context corresponding media segments. Database 180 may provide a temporary storage location for media segments generated from disparate devices before the media segments are stitched together to generate composite media.

Figure 2:
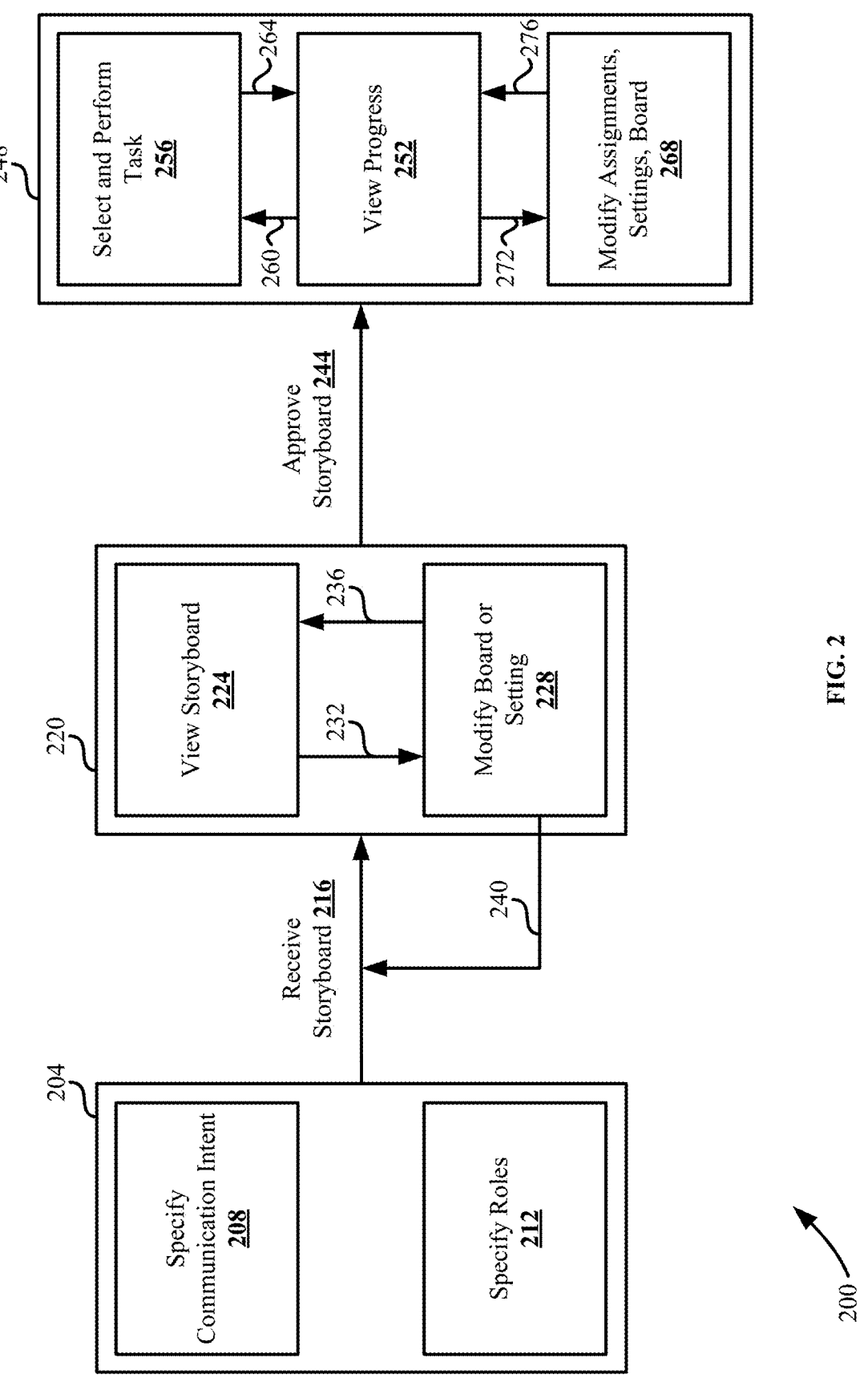
FIG. 2 is a block diagram of interfaces that specifies a storyboard, assigns roles, and manages tasks to create media according to at last one aspect of the disclosure.

FIG. 2 is a block diagram of an interfaces 200 that specify a storyboard, assigns roles, and manages tasks to create media according to at last one aspect of the disclosure. A user may use an interface, such as a graphical user interface, of a computing device to act as a director in a specific context 204. A computing device may be any device that executes software instructions, such as, but not limited to, a computer such as a desktop or laptop, mobile device such as a smartphone, server, a camera, or the like. Interface 208 may include software that enables a user to specify conditions for generating composite media. The user may indicate a communication intent 208 and the roles of other devices 212.

In some instances, the communication intent may be recommended to the user for user selection. For instance, one or more user communication types may be presented to the user based what the system knows about the user. In other instances, communication intent may be selected from a prioritized list. In still yet other instances, communication intent may be selected from a context specific list that may be based on user data such as the user's past selections, recent photos, recent media metadata, global position system (GPS) data, method of locomotion, likely activity, user communication such as texts or phone calls with other users, web browsing data, combinations thereof.

The user may specify roles 212 for generating one or more media segments (e.g., one or more clip(s) that may be included in the composite media) of the composite media.

The one or more roles can include, but are not limited to, generating a media segment, edit one or more media segments, review one or more segments, transform one or more media segments, or the like. In some instances, it may be assumed that all rolls will be completed by the user. In other instances, one or more roles may be completed by software based on one or more user preferences that executes on a computing device associated with the user or on one or more remote computing device. For instance, an AI may process two media segments by transforming one or more frames of the first media segment and one or more frames of the second media segment such that once combined the two media segments appear as a single composite media segment. The single composite media segment may be processed by the user (or one or more of the one or more other computing devices) to assess the quality of the transformation. The reviewing user or device may modify or approve the initial software-defined editing task.

Roles may also be assigned to one or more computing devices operated by software or by one or more users. For instance, software executing on the one or more computing devices may be configured to receive the role and corresponding details to execute the role. The user may specify roles for any number of computing devices. In some instances, the user may select from a list of devices some or all of which may not be known to the user. Specify roles 212 may be executed before or after communication intent 208 is selected.

In some instances, a user may assign roles to computing device associated with another user or entity such as an artificial-intelligence agent, a friend, a fan, a co-worker, a contracted worker, or the like. For example, roles of for generating a media segment may be assigned to the very same user who is the director, media segment trimming may be assigned to an AI, media segment evaluation and review may be assigned to anyone willing to respond to the users social media feed, media segment color correction may be assigned to a contracted worker, and audio processing of the media segment may be assigned to a user's friend.

In some instances, the user may define roles by first indicating how many computing devices, if any, will be contributing to the composite media generation. The user may then designate a role for each computing device. The user may select from computing devices that have reoccurring roles or that have previously executed a particular role. For instance, the user may select computing devices that previously generated a media segment or composite media with the user. A previous role executed by a computing device may be automatically selected as the role for that computing device. For instance, the last role for a computing device may be presented to the user as a drop down menu or the like. The user may then re-assign roles for each device.

At 216, a storyboard based on the communication intent and the selected roles may be received. The storyboard may be generated by a process executed on the computing device of the user or retrieved from local or remote storage (e.g., from a database). In some instances, the communication intent and the roles may be transmitted to a remote device. A processor of the remote device may process the communication intent and the roles and select an existing storyboard, generate a new storyboard, or modify an existing storyboard. Storyboards may include instructions for generating two or more ordered media segments that realizes the storyboard. A storyboard may be as short as two clips, as long as a feature length movie, or anywhere in between.

The user may iteratively view the storyboards at 224. The user may modify the storyboard or the underlying settings (e.g., communication intent, roles, etc.) that influence the generation of the storyboard. Modifications to a storyboard may return the user to 224 where the user may be presented with view of the modified storyboard. The user may modify the storyboard by adding or removing instructions of the storyboard that corresponding to one or more media segments such as adding a media segment, removing a media segment, or modifying a media segment.

Some modifications may cause a modification to other aspects of the storyboard. For example, a modification that removes or compresses a media segment may cause a modification to one or more other media segments of the storyboard to preserve features of the storyboard and maintain aspects of the communication intent such narrative structure or plot. The resulting modification may summarize the removed or compressed media segment to provide the communicative intent of the removed or compressed media segment with different, shorter, or fewer media segments.

One or more creative filters can be applied to the storyboard (e.g., all media segments) or to one or more media segments of a story board. For instance, a filter may be applied to the visual context (e.g. emotional tone) of a collection media segments. The visual context can be translated into instructions appended to the media segments of the storyboard that may be transmitted with the storyboard to recording devices. The visual context may indicate or influence the selection or generation of audio that may be embedded into the media segment, may modify the feedback provided to a recorder device during filming or review, or may modify the target question posed to a clip reviewer. Examples of filters include visual filters, contextual filters such as emotional filters, audio filters, combinations, thereof and the like.

If a setting a is changed, the process may follow 240 in which a new storyboard may be selected or generated based on the modified settings. The new storyboard may be received at 216 and the user may be directed to view the new storyboard at 224. The new storyboard may be selected or generated by the same process as the original storyboard was selected or generated or by a different process. For example, based on the initial communication intent and roles, a process on the user's device may executed to select a particular storyboard. Upon changing the settings associated with the storyboard at 228, the user's device may be unable to select the most appropriate storyboard and may instead transmit the modified settings to a remote device which may select or generate the storyboard that corresponds to the modified settings.

At 224, storyboards may be viewed in one or more representations. In some instances, storyboards may be represented as a sequence of instructions, where each set of instructions in the sequence direct the generation of a media segment. In some instances, the storyboards can be represented as a static graphic, which can improve multi-media segment review, selection of edits, a temporal based view of the media segments, etc. The static graphic may provide a graphical representation of each media segment as a sequence. The graphic may include graphical annotations of each media segment that enable a representation of the media segments as a graphic, text, animation, or the like. Media segments may be depicted with or without the graphical annotations. At 224, the user may "watch" the storyboard even though the storyboard lacks any recorded media segments. For instance, the instructions in the storyboard may be executed to generate a representation of the storyboard.

In some instances, each media segment of a storyboard may include a simplified preview media segment that can contain a line representation of objects to be rendered or captured by the media segment. For instance, the line representations can include characters, an abstraction of the background, and a color palette in the corner suggesting the key colors to use for a particular visual context. In other instances, the preview media segment may include a gray-scale video segment that contains the regions of the actors with skeletal pose suggestions, and a color palette in the corner containing a target RGB histogram, segmented in time by homogenous groups or frames. The color pallet can be provided as suggestion to the recording device or the color histograms can be used to generate instructions that cause the recording device to automatically apply filters to when recording the media segment.

Embedded instructions into the media segment instructions may enable real-time feedback to match the communicative intent of the storyboard. For instance, the color pallet may be used to automatically trigger a particular visual context such as a particular visual context that matches the communication intent. In some instances, the color pallet may be modified after the media segment is generated (i.e. recorded by a recording device) based on feedback received by one or more other devices. The feedback may indicate a modified color pallet that may be better increase the impact of a particular visual context, which may satisfy the communicative intent.

Users may be view the additional instructions presented to recording devices when viewing a media segment. Users may add, remove, or modify the additional instructions. The additional instructions may provide the recording device with an indication as to how the media segment is to be recorded, where the media segment is to be recorded, the color pallet of the media segment or an object therein, or include any other instructions that the recording device is to execute when recording the media segment.

At 224, the user may additionally view the transitions of the visual context via a symbolic abstraction of the visual context (e.g., a transition in color pallet irrespective of the content of media segment) or via a visualization of the target color histograms or suggested colors. In some instances, the user may edit the visual context by "painting" one or more media segments via user input. The user may be provide "painting" edits with gestures (e.g., cursor or finger gestures) or through command line. For example a single edit may be executed by a short swipe over a particular media segment or color pallet. A group edit to two or more media segments may be executed by a long swipe where the longer the swipe the more media segments that may be edited by the gesture. This "painted" addition may appear as a shift in color of the modified segments visual context. For example, an abstract visualization of the visual context may display an orange-blue axis for the optimism vs. pessimism of a character' outcomes. The user may also modify the pace of a media segment or the storyboard. The user may be presented with hierarchical interfaces that enable user selection of a pace or a modified pace. The interfaces may enable textual input, numerical input, a drop down menu, selection button, or the like.

At 244, the storyboard may be approved by the user and ready for generation. Approved storyboards specify a collection of tasks for completion by one or more agents. Agents may include artificial intelligence agents executing the user's device or on one or more remote devices. Agents may also include remote computing devices operated by one or more other users. The user may assign tasks to one or more agents at 248. For instance, an agent might record a media segment using a camera of a remote device based on a storyboard instructions associated with the media segment. Instructions for assigning or executing tasks may be input at 260 to 256. The progress of task under execution or the completed task may be reported at 265 to 252 to enable the user to view the progress. Examples of tasks can include, but are not limited to, recording a media segment, generating feedback for a recorded media segment, generating additional instructions for a media segment, modifying a recorded media segment, rating a recording media segment, transforming one or more recorded media segments, or the like.

The user may view progress 252 of the completed component tasks of the storyboard. Progress may be viewed in a spatial format (e.g., "partial storyboard") or a temporal format (e.g., "partial video"). A user may modify the assignment of roles, tasks, settings, the storyboard, the communicative intent, etc. at 268. The user may enter input received at 268 by 272. Once received, the modification instructions may modify the corresponding aspect of the process. Once modified, one or outputs may be presented to the user via 276. For example selecting a particular agent to complete more task in lieu of another agent. A user may change the settings 172. For example, at 268, the user may modify a target visual context of one or more media segments, updating corresponding instructions and evaluation functions. A user may modify the storyboard, by removing a media segment, moving the media segment to a different location within the sequence, modifying the media segment, or the like. The user may reject media segments recorded by agents, select a media segment recorded by one agent over another agent, or the like. Users may execute other actions at 268 by, for example, modifying one or more task definitions. After completing a modification at 268, an output 276 may enable the user to view the modified partial progress 252.

In some instances, the user may select and execute one or more of the tasks 256 in place of an assigned agent. For example, the agent may have been assigned as task to record a particular media segment. The user may record the same media segment before the agent. The submission of this task 264 may update the view of the partially completed storyboard and partial recoded media segments. The task assigned to the agent may be removed from the list of tasks and a notification may be transmitted the computing device of the agent notifying the agent of the tasks' removal. Alternatively, the user may be presented with a view that includes the particular media segment recorded by the user and the particular media segment recorded by the agent. The user may select one of the particular media segments.

After executing the processes of 204-268, the storyboard may be translated into to a media format such as video. In some instances, continued review of tasks and generated media segments can generate more tasks such as: alternative edits, reviews, or even the requests for new media segments. A user may modify settings that control the generation of additional media segments, edits, and/or review until a sufficient quality threshold is reached or exceeded.

FIG. 3 is a diagram of an interface that receives and executes audiovisual tasks according to at least one aspect of the disclosure. Generating composite media may include the execution of various types of tasks 230. Examples of types of tasks can include, but are not limited to, (1) generating instructions indicating how a media segment is to be generated, generating context for a recording device, (2) recording media segments based on associated instructions (e.g. a "narrative intent", a "visual context", or a derived specification), (3) evaluating two or more versions of a media segment, (4) transforming one or more frames of a media segment by apply effects or adjustments, (5) evaluating effects or adjustment, (6) modifying media segment trimming, (7) evaluating media segment trimming, (8) adjusting media segments with respect to audio, (9) evaluating the relationship of media segments and audio, (10) assessing and providing feedback of a media segment, or (11) the like.

The interface of FIG. 3 provides a process that receives and assigns tasks to remote devices for execution enabling a distributed media creation process that uses one or multiple disparate devices with different attributes and roles. The composite media generation may define storyboards that themselves define small tasks that may be executed by unrelated remote devices. The output from the execution of these small tasks can be integrated together as part of a large collection of coherent tasks that all align with a unified goal. For instance, a composite media may be generated from a 1000 small tasks each executed by a 1000 computing devices. Any number of remote devices may be used to generate composite media. Increasing the number of devices may reduce the resources and time necessary to generate composite media. By reducing the composite media generation to small tasks only the relevant data associated with a particular media segment may be transmitted to the computing device that may be generating that media segment.

In some instances, users may view a lower resolution images or a multiresolution pyramid representation of each media segment. Multiresolution pyramids may be focused on regions known to be informative or challenging for a particular task such as dark shadows and facial details. The data may specify the context of the task to be transmitted, which may be any fraction of the total composite media generation project. The processes executed on the data may be encoded in a much smaller space, allowing remote computational resources to operate on higher resolution data reducing bandwidth, time, and resources.

FIG. 3 depicts a block diagram of interfaces that receive and execute audiovisual tasks 200. The interface may be connected to communication interface that communicates over one or more protocols with multiple computing devices. The interface 304 may receive one or more tasks at 308. Tasks may be analyzed to determine an effectiveness in executing the task and providing an intermediate output that can aggregated for the generation of the composite media. If the task fails to meet one or more metrics (e.g., poor execution performance, poor quality media segment recorded, etc.) the task may be rejected at 312 via 316 or reassigned. In some instances, tasks may be rejected by a remote computing device via the communication interface. The rejected tasks may be propagated back to receive tasks 308 where another task may be received (in place of the rejected task) or the rejected task may be recorded as rejected. If more than one task is received and/or where previous tasks remain visible (e.g., due the previous task being incomplete, but not rejected), the tasks may be view and selected, allowing for the rejection of more tasks via indication 316 and confirmation 320.

The user device may select a task for execution at 324 and proceed to interface 328 or the selection 225 of one of them. Selecting a task 324 provides present more information about the task within interface 328, allowing feedback to execute the task itself 332 (e.g. a view of what the camera sees while recording from it) as well and the context of the task and tips 336 for what to do to complete the task well, according to the criteria specified. In some instances, the context and tips 336 may be received via input 340 may a user or a remote computing device. The received takes context and tips 336 may be transmitted 344 to improve execution of the task 332. In some instances, the task context and tips may be presented on the same computing device that includes the camera. In other instances, the task context and tips may be presented concurrently in a different channel (e.g., on a separate computing device or via a speaker through audio). In some instances, the trigger of additional tips 336 is generated by a process 340 specifying the conditions that determine the tip. For example, a program could specify the instructions for image translation or inertial measurement, which may provide instructions to stabilize an image.

In some instances, the instructions may cause the device to automatically stabilize the image. For example, the instructions may use an artificial-intelligence agent to process frames of a media segment before and after one or more images and execute one or more image processing transformation on the image to stabilize the image. In another example, the instructions may operate an actuator controlling the camera mount and automatically stabilize the image. In other instances, the instructions may output text that direct a camera operator to, for example: "hold camera against chest and rotate in place". The process 340 may determine the conditions and nature of the feedback to provide to the user device ("the tip") as well as the conditions 344 to remove the tip (e.g., by executing the instructions that correspond to the tip).

Examples of instances that may be used to remove the tip include, but are not limited to: (1) time interval such as after 5 seconds. (2) the user device may receive an acknowledgement of receiving the tip to remove the tip, (3) the tip may cause a tinted color effect that may remain until the camera is determined to be sufficiently stable again (e.g., via the statistics of subsequent image translations and inertial measurements), (4) an icon can be presented to provide real-time visual feedback of image shakiness, (5) a screen of the user device may be tinted a color and a transparent diagram of how to hold the camera may be shown.

Once the task has been executed at 332, the output may be submitted at 348. In some instances, submitting a task may include transmitting the output and corresponding content to an assigning device. In other instances, submitting the task output 348 may include transmitting the task output corresponding content to a cloud database for storage. In still yet other instances, submitting the task output simply transmits a communication indicating that the task has been completed. A computing device may then request the task output at a later time. Once completed, other processes may evaluate the task output and corresponding content to assess its relationship to other media segments of the story board. In some instances, actions may be executed on the sequence of media segments such as a review, added filter, a new suggested media segment, a reward for high quality submission, a log of quality for aggregate insights for the director account, instructions to improve a retake of a media segment, a proposed twist in the narrative structure of the storyboard, a question that prompts what context is next, combinations thereof and the like.

Figure 4:
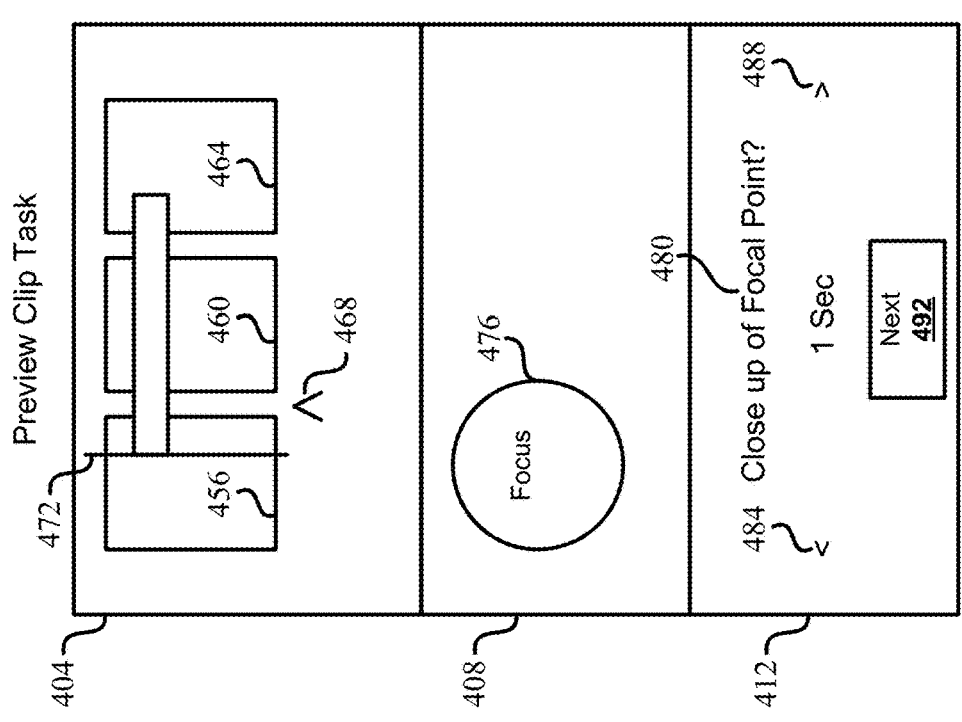
FIG. 4 is a block diagram of interfaces that generate instructions for devices to generate media segments according to at least one aspect of the disclosure.
Figure 4:
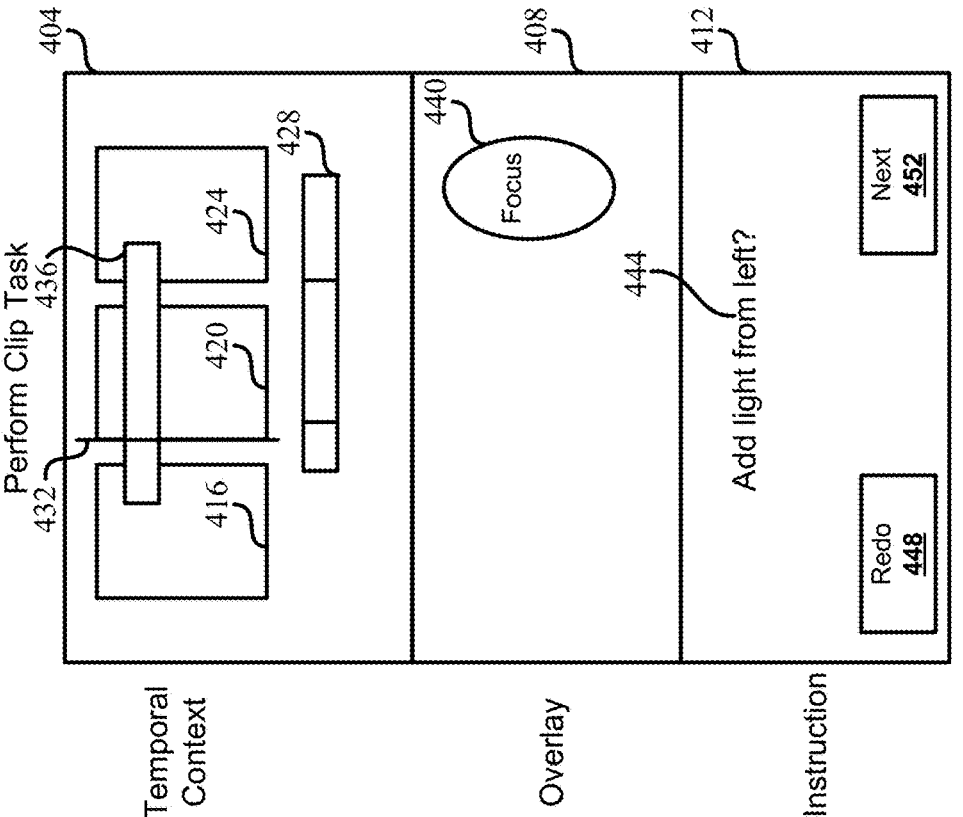
Figure 4:

FIG. 4 is a block diagram of interfaces that generate instructions for devices to generate media segments according to at least one aspect of the disclosure. Tasks that may require a collection of data can be augmented with additional types of media that provide context 336, as seen in a view that lets a user execute a task to record a media segment or even a preceding task that allows a user device to preview a proposed task in the context of pre-existing media segments. In some instances, the context of a task may involve providing video segments before and after a given media segment, to provide an indication as the properties of a recorded media segment compare to surrounding media segments of a clip fit into the surrounding context.

Temporal context 404 provides a comparable representation of a target media segment to a media segment specification (e.g., the storyboard representation of the media segment) and to other media segments that surround the media segment in the sequence (e.g., the media segments that appear before and after this media segment). Temporal context 404 includes the preceding media segments 416/456, an alternative representation of the media segment 420/460 and the following media segment 424/464 For example, the preceding media segments 416/456 and following media segment 424/464 may show the media segments that appear before and after the media segment as recorded by this or another device. In some instances, an abstraction or an approximation of each media segment may be presented. The media segment to be recorded may be represented by an abstract grayscale rendering of the desired clip, a static linear drawing, an approximation of the scene based on a similar match to a media database, a sample from a generative model, a blurred version of an alternate take of the media segment, or the like.

Temporal context may provide playback indicators for presenting a media segment sequence. For instance, playback 428 may indicate a representation of the sequence of media segments as a single segment with indicators as to the location within the composite media where each media segment begins and ends. Review 436, provides context of what media segments are current playing. As playback progresses the bar 432/472 moves from left to right. Carrot 468 may be selected to expand or hide media segments that correspond to a similar context.

Overlay 408 may present a representation of the target media segment. For instance, the target media segment may be encoded as an overlay of lines, indicating the starting and ending position of key elements 408 in the segment. For example, an object may be labeled 440. For example, the starting and ending position of a focal point such as a face may be encoded as two bounding boxes with an arrow from one to the other. In another example, an outline of a body may be encoded as a time series overlay of images, indicating the target position as it changes throughout the temporal media segment. In another example, a sketch with elements scaled and transformed from one position 440 to another 476 may indicate the desired motion of elements and/or camera.

Instruction 412 may indicate a modification of a previous media segment, with an encoded difference. For example, direction 444/480 may recite "record the same clip again, but everyone moves faster" or "have character A impatiently interrupt character B more." Direction 444/480 may indicate that the camera is to record in portrait mode or landscape mode, provide a color palette, visual filter, a target color histogram, a verbal description of the visual context, a graphic encoding the desired pace, the associated audio that corresponds to a target clip, or audio that is representative of the feeling that the scene is meant to communicate. This additional "context" provides the conditions that allow two equally good media segments to be evaluated.

Instructions 412 may include a redo button 448 to record a new version of the media segment or a next button 452/492 to move on to the next media segment or task. In some instances, instruction 412 may include a forward button 488 to review the next instruction, if any, and a backward button 484 to review the previous instruction, if any.

Figure 5:
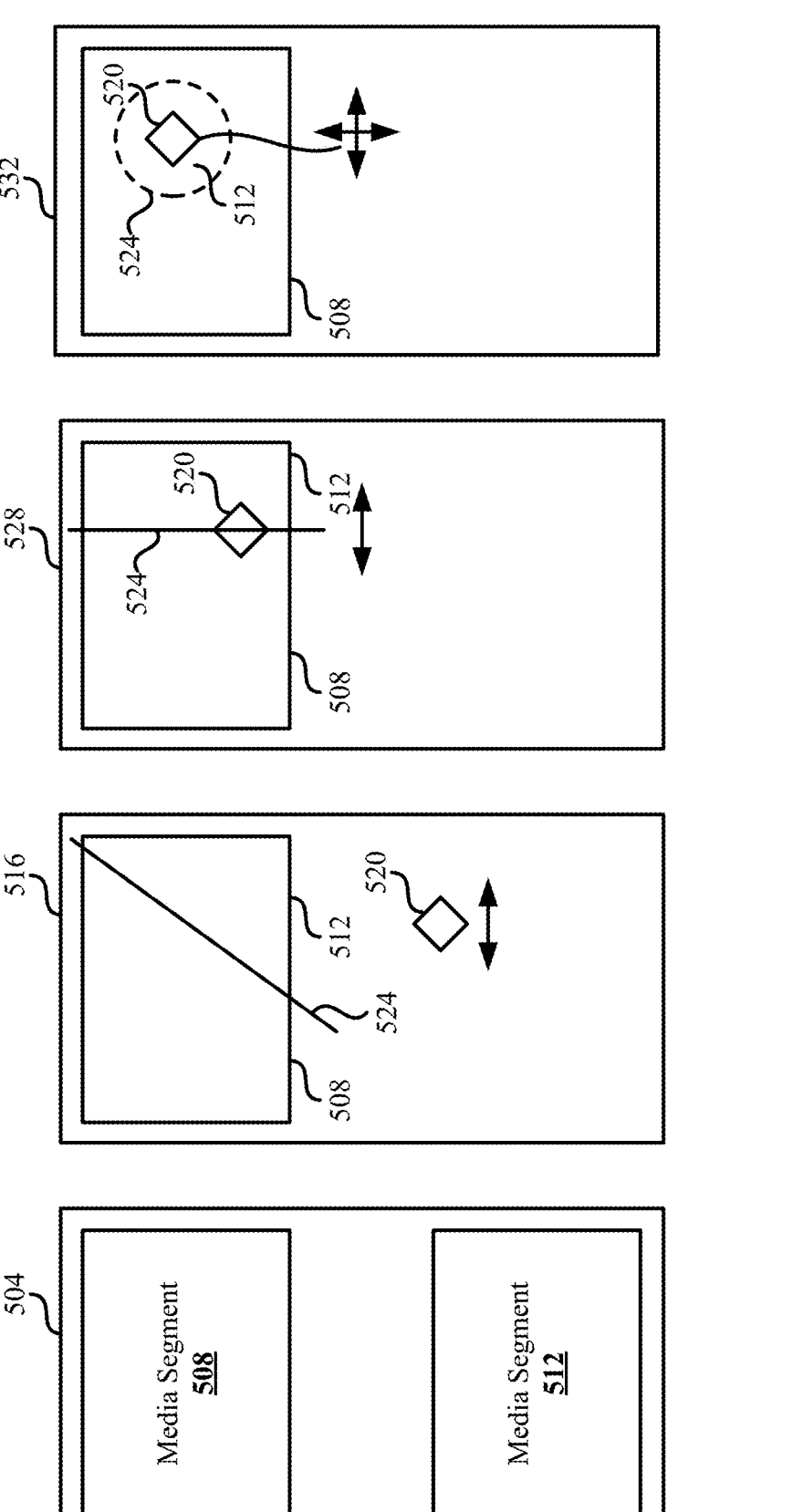
FIG. 5 is a block diagram of interfaces for reviewing media segments according to at least one aspect of the disclosure.

FIG. 5 is a block diagram of interfaces for reviewing media segments according to at least one aspect of the disclosure. Interfaces 504, 516, 528, and 532 provide different ways of comparing two different versions of a media segment. Interface 504 may present two or more media segments for review. A first media segment 508 may be a first recorded version of the media segment or a media segment specification such as a line drawing of the media segment. The second media segment 512 may represent a first version of the media segment (if media segment 508 is representing the media segment specification) or a second version of the media segment. Each media segment can be played independently or synchronized such that a frame by frame comparison of each media segment may be performed. This may enable a user to identify how well the media segment capture the media segment specification or if one version of the media segment comparably better than another version of the media segment. Although only two media segments are shown, 508 and 512, any number of media segments may be simultaneously displayed with each additional media segment causing the display window to decrease in size to accommodate the additional media segment.

Interface 516, provides a gesture based input for comparing two different scenes within a same window display. The display window is bisected by diagonal bar 524 into two windows, the size of which can be controlled via gesture input 520. In window 508, the computing device may render the media segment specification or the first version of the media segment. In window 512, the computing device may render the first version of the media segment if the media segment specification is being displayed in window 508 or the second (or subsequent) of the media segment if the first (or previous) version of the media segment is being rendered in window 508. Gesture input may be a swipe gesture through a touchscreen interface or mouse interface that moves the diagonal bar 524 to change the size of windows 508 and 512. Gesture 520 may accept input from any location on the interface such as over the window 508/512 or below as shown. Interface 528, represents a similar version of interface 516 in which the gesture input 520 occurs exclusively over window 508/512. The window may also include a vertical bar 524 instead of a diagonal bar 524.

Interface 532 may include another variation in which a circular window may appear within the display window. The circular may provide the divider between versions of the media segments that are currently being rendered. Gesture 520 may accept input any direction to increase or decrease the diameter of the circle 524 and the window 512 rendering media a version of the media segment that is different from version rendered by window 508. Although various directional bars and geometric shapes are shown for creating a window within a window, any particular bar or shape may be used to create the window within a window effect. The gesture for increasing or decreasing the size of window 512 may be of any particular gesture or input including command line, mouse, motion gesture, touch screen, or the like. The media segment rendered in window 508 and 512 may be predetermined or selected by a user. In some instances, the media segments may be entirely different recordings of the same scene. In other instances, the media segments may be the same, with one media segment include one or more additional transformations or filters that are absent from the other media segment.

Figure 6:
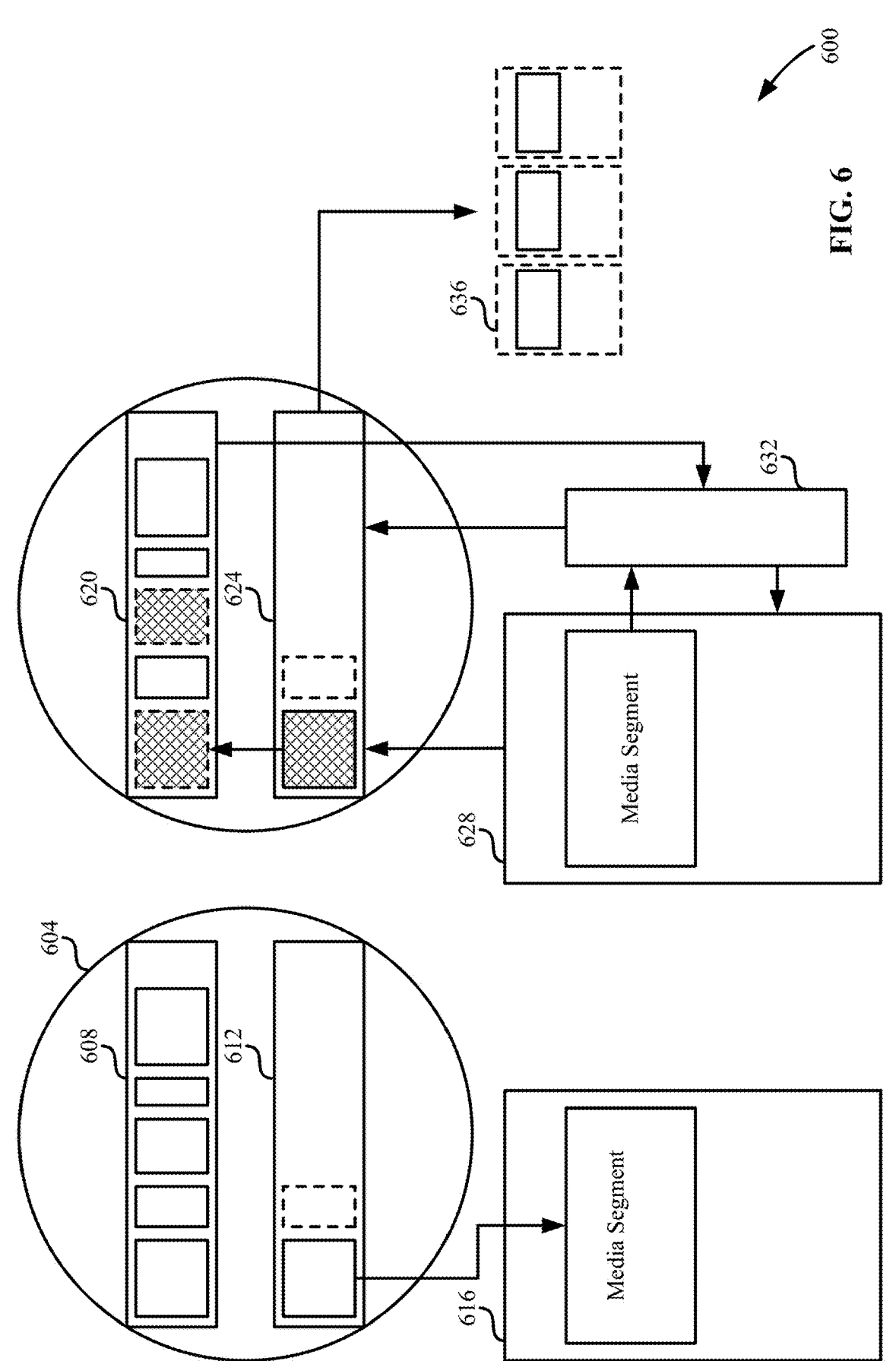
FIG. 6 is block diagram of a multi-device distributed processing system according to at least one aspect of the disclosure.

FIG. 6 is block diagram of a multi-device distributed processing system according to at least one aspect of the disclosure. A cloud process 604 may direct the distribution of tasks to computing devices operated by users or AI agents. The cloud process may break down a storyboard into any number of tasks and distribute those tasks to one or more computing devices. Cloud process 604 may identify a composite media specification 608 for generation. The composite media may indicate a sequence of one or more media segments that make up the composite media. Composite media specification 608 may indicate which media segments have been need to be assigned to devices, which media segments have already been assigned, which media segments have already been generated, a rating for each generated media segment, and the like. Composite media specification 612 may be a sub-specification that is assigned to a particular computing device such as computing device 616. Cloud process 604 may assign tasks to computing device 616 using composite media specification 612.

Composite media specification 612 may transmit a first task to generate a media segment to computing device 616 with one or more instructions directing computing device 616 as to how to record the media segment. Computing device may generate the media segment and transmit the media segment to the cloud process 604. Composite media specification 612 may then transmit a subsequent task, if any, directing the computing device provide further processing. Cloud process 604 may execute one or more AI agents that provide additional processing of received media segments. For instance, since media segment may be received from different devices that include different hardware specifications, the AI agents may analyze each received media segment and transform the media segments to generate a coherent and cohesive sequence of media segments. The AI agents may provide image processing of one or more frames, pixel analysis, color correction, affine transformations, sharpening, trimming, combinations thereof, or the like.

AI agents or other software executing in cloud process 604 or on devices 616 and 628 may analyze media segments for particular color characteristics. For instance, analysis may specify the communication intent. A storyboard may be defined that contains representations of media segments to be generated to realize the storyboard as a composite media and an indication of a visual context. For each media segment specification, color suggestion may be applied along with color target metadata. The color target metadata indicates target colors that that should appear within the generated media segment. Color suggestions may be displayed to provide context to a computing device prior to recording the media segment. A color filter may be applied to the recoded media segment to provide visual feedback to the computing device. The magnitude of the color filter may be modified based on the content of the recorded media segment and the computing device's feedback. For instance, the magnitude may be increased if the recorded media segment includes a color that is distinct from the suggest color and decreased if the color is close to the suggested color.

AI agents or other software executing in cloud process 604 or on devices 616 and 628 may analyze media segments for particular motion characteristics. After defining the storyboard, motion suggestions and motion target metadata may be applied to each media segment specification. The motion suggestions may provide context prior to the media segment being recorded. The target motion metadata may be used to automatically trim media segments and provide time dilation. Alternative, the target motion metadata may provide suggestions to trim media segments and provide time dilation.

In some instances, the cloud process 604 may not provide the AI agents. Instead, the AI agents may be executed by the computing devices 616. For instance, A media segment based on a media segment specification received as a task from a cloud process may be generated by device 628 and transferred to an AI agent 632. AI agent 632 may be integrated into the computing device 628 or locally connected to the computing device 628. The AI-agent may receive details of other media segments surrounding the media segment generated by computing device 628 and perform one or more transformations to ensure that the media segment generated by computing device 628 conforms to the style and pixel characteristics of the other media segments in the cloud. In some instances, the AI agent 632 may upload the transformed media segment to the cloud. In other instances, AI agent 632 may transfer the transformed media segment to computing device 628 and computing device 628 may transmit the transformed media segment to cloud process 604.

Cloud process 604 may distribute tasks to any number of computing device 636. In some instances, all of the devices 636 may include an AI agent to execute the processing of composite media generation in a distributed and scalable system. In other instances, such as where the AI agent may not be configured to execute on the hardware of a particular device of computing device 636, some of the computing devices may receive an AI agent while others may relay on the AI agent that is part of cloud process 604.

Figure 7:
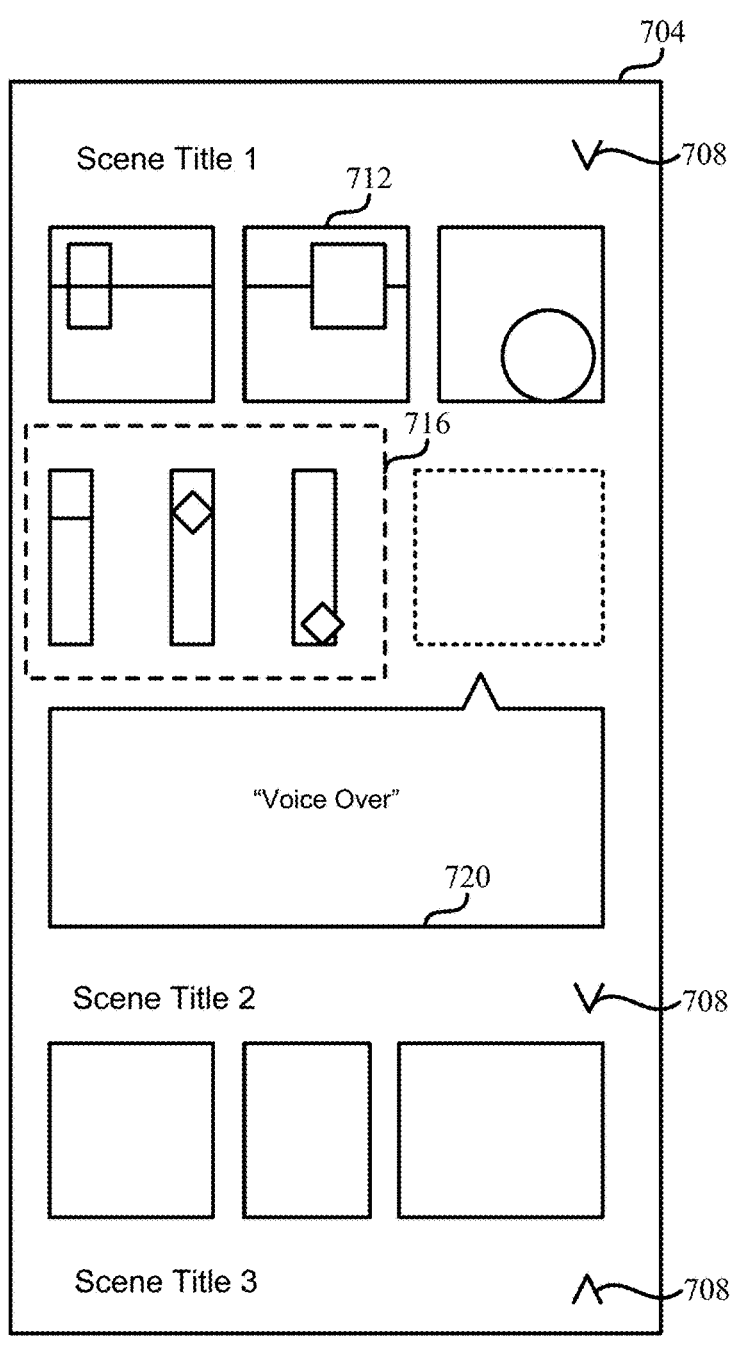
FIG. 7 is a block diagram of a media segment assignment and review interface according at least one aspect of the disclosure.
Figure 7:
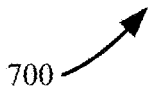

FIG. 7 is a block diagram of a media segment assignment and review interface according at least one aspect of the disclosure. Interface 704 provides a representation of media segments generated or to be generated to generate composite media. The interface may include one or more scenes reference by title with a carrot 708 that enables the media segments associated with the scene to be displayed or hidden. The media segments with a solid line have been generated by one or more computing devices collaborating to generate the composite media. The media segments with a dashed outline have not yet be generated.

Media segments 712 can be selected to receive additional information 720 or to select the media items to execute one or more tasks. Three media segments 716 have been selected to be recorded by this computing device. Additional information 720 may be displayed within a same region as the media segments or in a in a different interface. Additional information 720 may indicate a voice over that is to be included over the media segment.

Figure 8:
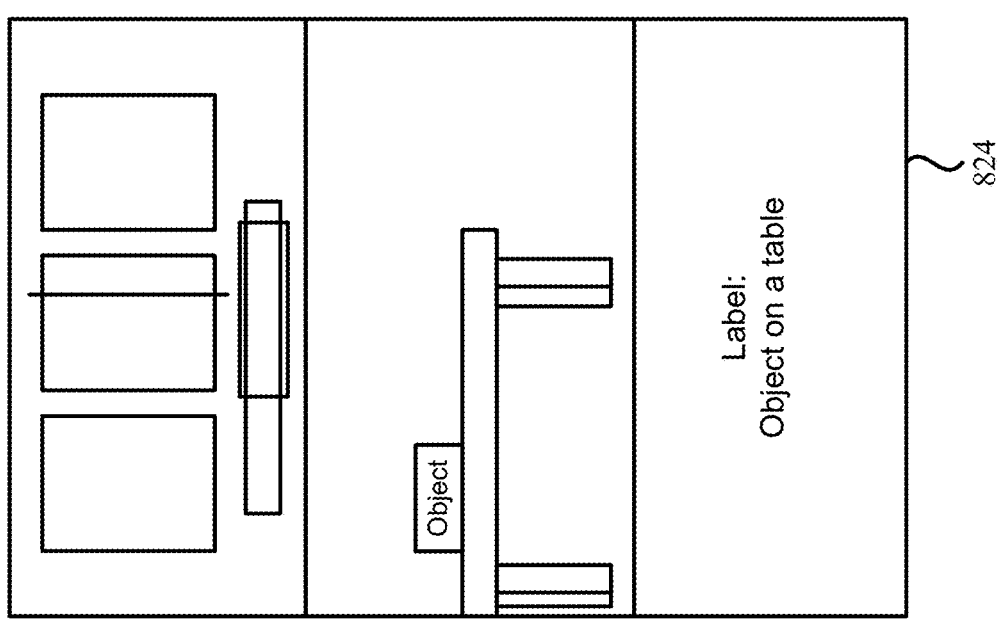
FIG. 8 is a block diagram of an interface that assigns contextual image labels according to at least one aspect of the disclosure.
Figure 8:
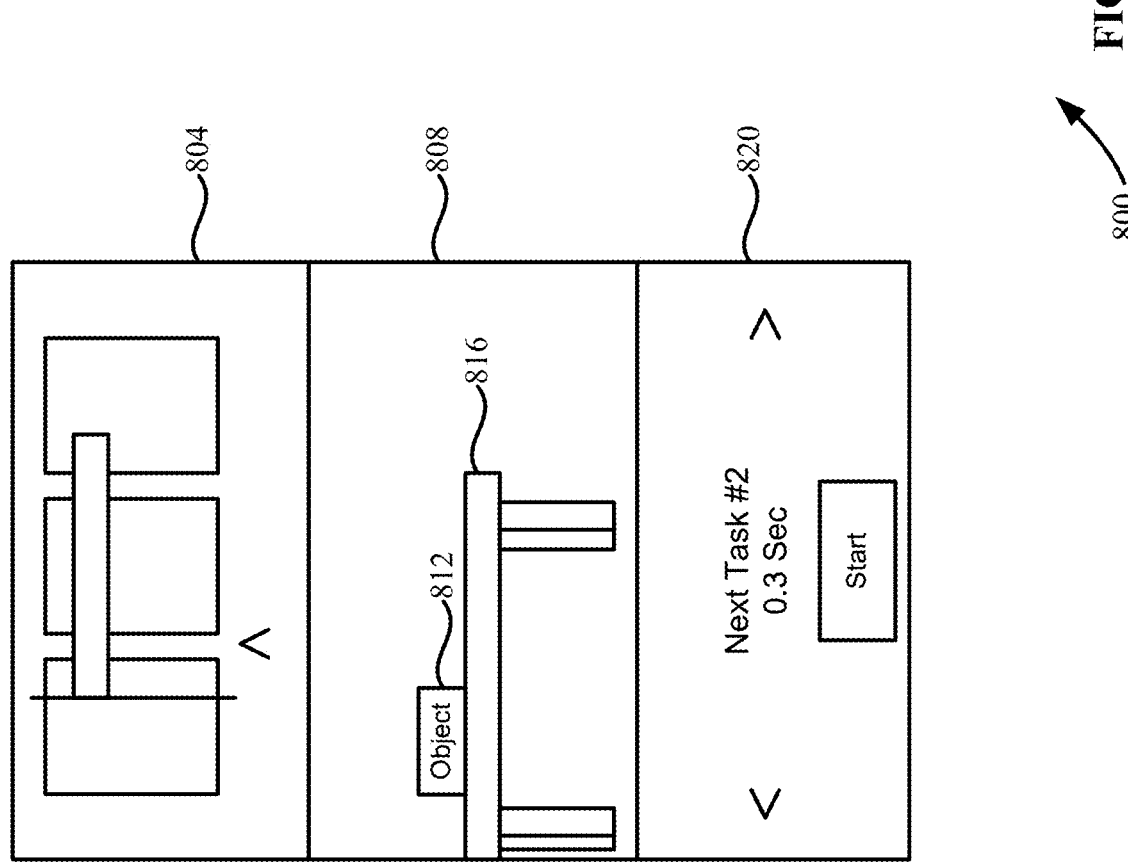

FIG. 8 is a block diagram of an interface that assigns contextual image labels according to at least one aspect of the disclosure. Characteristics represented by frames of a media segment may be labeled to provide additional context and review of recorded media segments. In some instances, an AI agent may perform image processing to label the contents of frames. The AI agent may be a neural network that receives an image as input and provide an identification of one or more objects as output. The neural network may be trained using supervised or unsupervised learning. In supervised learning, a set of labeled images may be input into the neural network. The neural network may define a feature set (e.g., a set of image characteristics that indicate the presence of the label). The feature sets may be used by the neural network when non-labeled data is input to the neural network.

The labeled image data may be received via interfaces 800 of FIG. 8. Each interface may present a temporal window 804 that renders one or more media segments in a sequence enable a user to watch the one or more media segments for added context. The target image may be presented at window 808. For example, the image may depict a table 816 with an object on top 812. Task management window 820 may enable the user to select between different labeling tasks using the arrows. The user can select the start button to begin image labeling. Once selected, the user may be directed to input a label. The user may enter in alphanumeric text or select from preset options such as from a dropdown menu. Once entered, the interface may present another image for labeling or wait to receive a new task.

User based labeling may be used initially until a sufficient quantity of labeled images exists to train the neural network. Once trained, the neural network may take over image labeling provided a particular level of quality can be maintained. In some instances, if the quality of the image labeling falls below a threshold value, the neural network may be re-trained using the training data and/or any additional labeled images obtained before re-training was initiated.

FIG. 9 is a block diagram of distributed task processing system according to at least one aspect of the disclosure. Each square represent a media segment recording task that may be distributed to one or more computing devices. Dashed lines represent media segments that have not yet been assigned, solid boxes represent media segments that have been assigned but are not yet completed, hatched boxes represent media segments that are completed, shaded boxes represent media segments that are completed and are highly rated, and solid boxes are those media segments that have been selected for inclusion into the composite media final product.

As a new composite media process is initiated each of multiple tasks may be assigned. A media process such as a cloud process may determine how many tasks are to be generated for a particular composite media and how many devices those tasks are to be assigned to. Tasks may be assigned one by one or in batches to computing devices. Not all tasks may be assigned at once. For instance, tasks may be assigned to particular computing devices that have been highly rated for those types of tasks or to computing devices with the capability to execute the assigned tasks. In some instances, there may not an available computing device to assign a task to or searching for an available computing device may take longer than for other types of tasks. At the third stage, computing devices begin transmitting completed media segments that may be represented by hatching.

The fourth stage rates those media segments that have been completed. Media segments may be rated automatically based on criteria defined by a storyboard or by one or more other computing devices. Highly rated media segments may be represented by shading. The fifth stage reassigns tasks that are not highly rated to one or more other computing devices. The other computing devices may execute the tasks to generate an alternative version of media segment at stage six that be determined at stage seven may be of a higher quality. The process may repeat again until each task has been executed to generate a media segment that is highly rated.

At stage ten, the best media segment from each task may be identified. The remaining media segments may be removed. In some instances, if there is no highly rated media segment for a given task the media segments for that task may be omitted from final composite media. In other instances, the media segments may be evaluated to determine if particular media segments may be removed. For example, media segment that is a transition between a first media segment and a second media segment may not be highly rated. It may be determined that the media segment may be omitted without affecting the narrative of the completed composite media. At stage eleven, the remaining media segments may be optimized by, for example, executing one or more image processing processes on the media segments. Optimization transform portions of the media segments to conform to other media segments. For example, optimization may provide a coherent color scheme through color filtering.

At stage twelve, the optimized media segments may be re-trimmed such that the sequence of media segments may be sequentially played seamlessly. At stage thirteen, the trimmed media segments are ranked and combined into a completed composite media. Stages one through thirteen may be executed once, multiple times, in order, or out-of-order.

Figure 10:
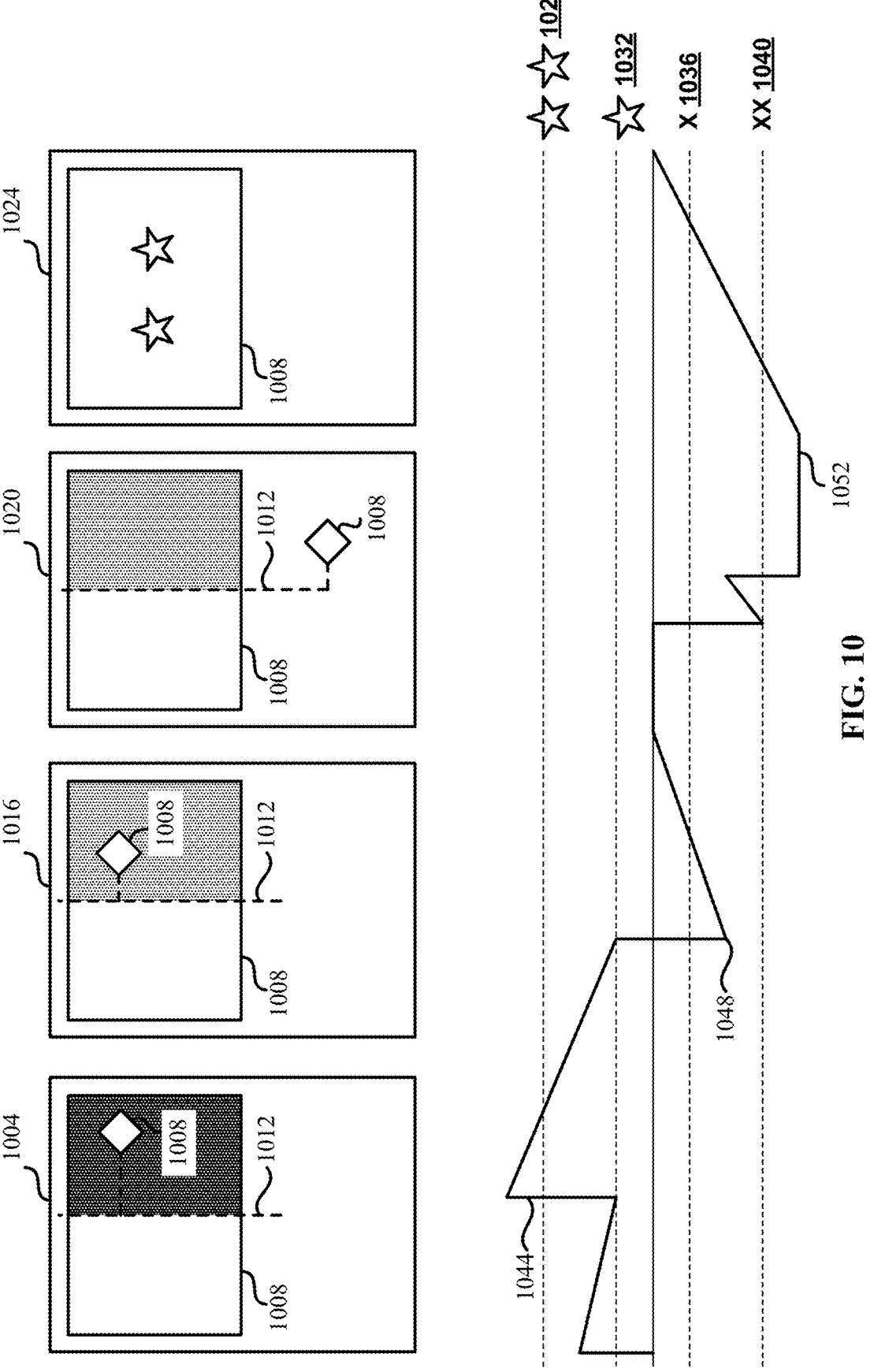
FIG. 10 is a block diagram of a media segment rating interface and graph corresponding to media segment ratings according to at least one aspect of the present disclosure.

FIG. 10 is a block diagram of a media segment rating interface and graph corresponding to media segment ratings according to at least one aspect of the present disclosure. Reviewing may occur in real-time and provide visual feedback based on reviewed media segments. Interfaces 1004, 1016, 1020, and 1024 represent multiple ways of rating media segments. In some instances, only one of interfaces 1004, 1016, 1020, and 1024 may be used to rate media segments. In other instances, any one or more of interfaces 1004, 1016, 1020, and 1024 may be used to rate media segments. Interface 1004 may use a gesture based input 1008 that can be dragged from one location of interface 1004 to another location. For instance, the user may press along central vertical axis of media segment 1008 and drag the finger left to indicate a poor rating and right to indicate a good rating.

In some instances, the side selected my turn a color corresponding to the rating (e.g., green for good rating and red for a bad rating. For example, the media segment of interface 1004 very good ranking that can be observed by the dark shading. On the other hand interface 1016 received a lower rating based on the gesture input 1008 not being swiped as far in the right direction from the central axis. The degree in which the gesture input 1008 is pushed in the left or right direction relative to the vertical axis can be used as to define a degree of the rating. Interfaces 1004 and 1016 present the gesture input 1008 as being over the media segment 1008. Interface 1020 depicts an interface in which gesture input 1008 may be positioned wherever the user makes an initial input (e.g., cursor location when a mouse click event is detected or place in which the user's finger contacts the touchscreen interface).

Interface 1024 provides another alternative option for indicating a rating. One or more stars may be selected to indicate a degree in which the media segment is positively rated. One or more X's may be selected to indicate the degree in which the media segment is negatively rated. Alternatively, the rating may be a numerical rating such as a number between 1-10 or 1-100 or alphabetically rated such as A-F. Media segments may be rated by any technique that indicates a degree of positive or negative rating without departing from the spirit or scope of the present disclosure. In some instances, media segments may be rated by a single metric. In other instances, multiple properties of the media segment may be individually rated. For example, properties of the media segment may include pace, lighting, smoothness, frame jitter, visual context, content, color pallet, length, audio, brightness/contrast, or the like. In some instances, the physiological aspects of actors within the frame or the viewers of media segments may also be used to rate a media segment. Examples of physiological aspects can include, but is not limited to heart rate, video stop rate, breath, gaze, pupil dilation, body movement, neuromodular concentration, galvanic skin cell response, or visual or auditory expression of emotional affect. The physiological metrics may be used to improve a time varying estimate of valence from the video. When ratings are assigned to each of multiple properties or physiological aspects of actors or viewers, the ratings may be aggregated into a single value.

The rating assigned to media segments may be plotted along a graph indicating the valence of media segments over time using for example, assumptions associated with media segments or reviews. For instance, the response of a particular user's rating at distinct time intervals can be transformed into a smoothed estimate of valence over time, which may attribute valence to the media segments preceding the rating. The graph may include a central horizontal axis with thresholds for highly rated 1028, positively rated 1032, negatively rated 1036 and poorly rated 1040. The composite media includes a sequence of individually rate media segments that may be plotted. In some instances, the graph may be dynamically generated in real-time such that as ratings change, the graph may change to match in real-time. The plotted composite media includes a highly rated media segment 1044 that may be marked as being part of the composite media. In some instances, the graph may be illustrative of the transforms based on user ratings such that the data that would then be provided to systems that evaluate media transforms. In other instances, the graph may be rendered for presentation to one or more computing devices.

Media segment 1048 may be negatively rated. Negatively rated segments may be marked for re-assignment such that it the negative rated media segment may be replaced by another, potentially high rated media segment. Media segment 1052 is poorly rated. Poorly rated media segments may be poorly rated due to low quality, due to incoherence with the narrative of other media segments, or a combinations thereof. Poorly rated segments may be analyzed to determine a cause of the poor rating. If the cause is the content of the media segment rather than the quality, the media segment may be removed from the composite media (and not replaced).

Figure 11:
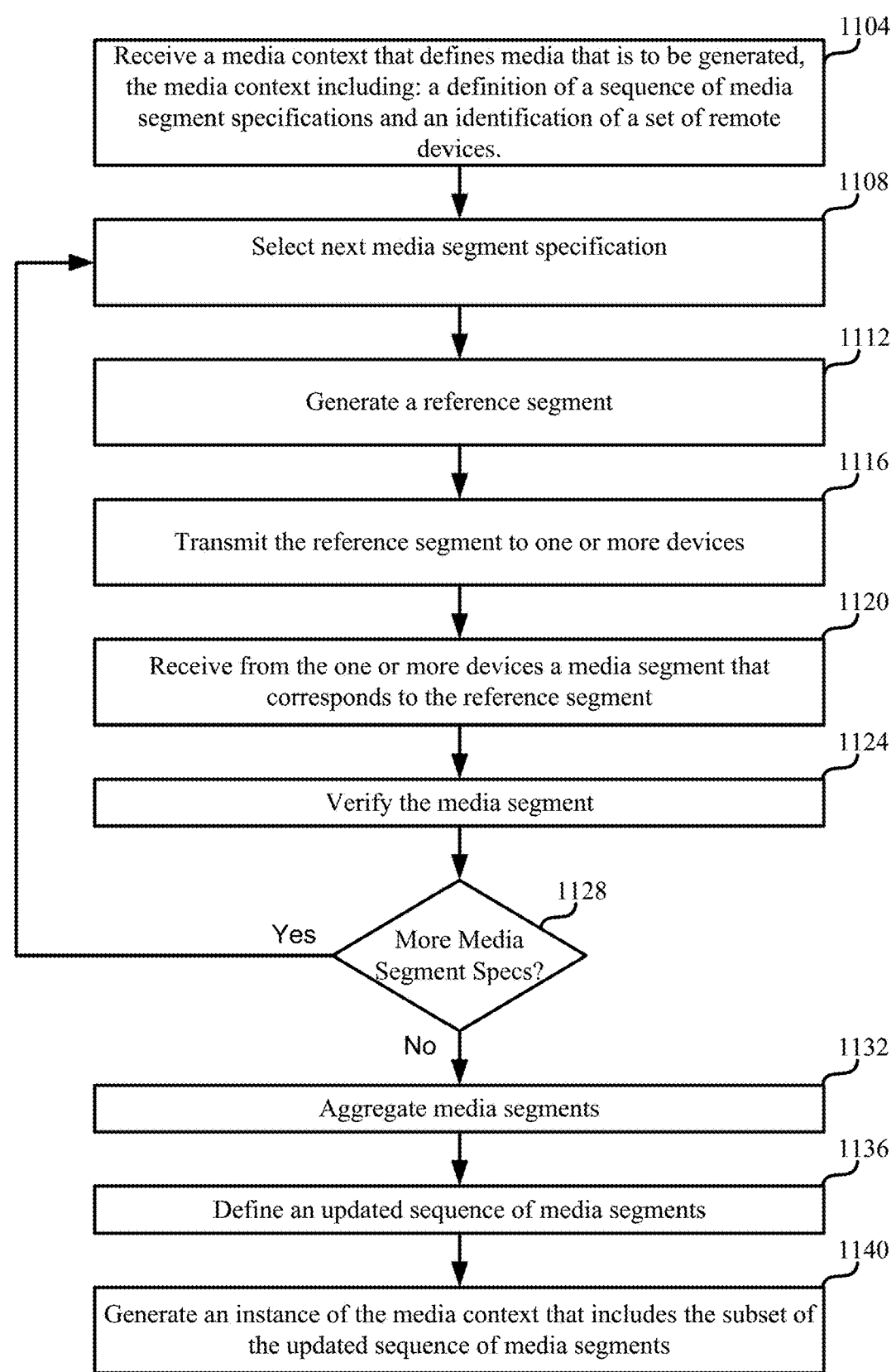
FIG. 11 is a flowchart of a process generating a composite media using distributed mobile device network according at least one aspect of the disclosure.

FIG. 11 is a flowchart of a process generating a composite media using distributed mobile device network according at least one aspect of the disclosure. At block a media context may be received. The media context may define composite media to be generated using a distributed processing network. The media context may include a storyboard that describes a sequence of media segments to be included in the composite media to present a particular narrative. The media context may include constraints such as aesthetic constraints, a color pallet, visual context for one or more media segments, quality constraints, and the like. The media context may include an identification of a set of remote devices that may provide some or all of the processing that generates the composite media.

At block 1108 a next media segment specification can be selected for processing. If this is the first execution of block 1108, then the first media segment specification may be selected. At block 1112 a reference segment may be generated for the media segment specification. The reference segment may be a temporary representation of the media segment such as a line drawing, a grayscale image or animation, or the like. At block 1116, the reference segment may be transmitted to one or more remote devices. In some instances, the reference segment may be transmitted to two or more remote devices such that media segment may be received from each of the two or more remote devices. The remote devices may include a computing device with a camera (e.g., a mobile device such as a smartphone). The reference segment may direct a user of the remote device to record a media segment using the camera. In some instances the reference segment may direct the recording of media segment in a particular context such as with a particular color pallet, from a particular perspective, pace, or the like.

At block 1120 a media segment that corresponds to the reference segment may be received. The media segment may include video and/or audio. Media segments may be of any length from a single frame to enough frames to render hours of video. At block 1124, the media segment may be verified according to one or more constraints. The constraints may enforce particular style or quality metrics for the media segment. For instance, the media segment may not be verified if it does not include particular color pallet or if it is too if the frame jitter is too high. Verification may also determine if the media segment accurately reflects the reference segment. For example, if reference segment may indicate a beach segment, the verification may determine if the media segment correspond to a beach environment. If not, the media segment cannot be verified. Unverified media segments may be discarded and the corresponding reference segment may be re-assigned to another computing device.

At block 1128, it is determined if there are more media segment specifications. If there are more, then the process may return to block 1108, where the next media segment specification may be selected and blocks 1112-1124 may be repeated for that media segment specification. Otherwise, the process continues to block 1132 where the generated media segments may be aggregated. Once aggregated an updated sequence of media segments may be defined at block 1136. The updated sequence may an analysis of each media segment to determine if the sequence of media segments should be reordered. In some instances, the updated sequence of media segments may be the sequence of media segments. In other instances, the update sequence may include at least two media segments in a different order.

At block 1140, an instance of the media context may be generated. The instance may include a subset of the updated set of media segments. For example, the subset of the updated media segments may include some or all of the media segments. In some instances, the subset may include one or more moments obtained from media sequences. A moment may include one or more frames selected from a media segment. In some instances, when a moment is selected the remaining frames may be discarded or omitted from the subset of the updated sequence of media segments. In other instances, some or all of the remaining frames of a media segment may be included in the same or order or in a different order.

In some instances, generating an instance of the media context may include executing one or more transformations such as pan, trim, stabilizing jitter, style transforms such as enforcing a color pallet, object identification or removal, embedded audio, image processing processes, a particular smoothness, or the like. For instance, an audio sample such as music or a voice over may be received from a remote device and embedded into the media segment. In another instances, two or more remote devices may record audio in a same room. The audio may be processed by blind source separation of a particular audio sample to remove noise.

Specific details are given in the above description to provide a thorough understanding of the embodiments.

However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a computer-readable medium such as a storage medium. The computer-readable medium may be a non-transitory computer-readable medium which may include any volatile or non-volatile memory types of memory. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
accessing a media context that defines media, the media context including an identification of a specification of a first media segment and one or more quality metrics;
accessing one or more first media segments;
receiving an input that includes information indicative of a target second media segment, wherein the information includes at least part of a storyboard specifying one or more tasks for completion by one or more artificial-intelligence agents;
identifying, using an artificial-intelligence agent technique, a reference segment to supplement the first media segment based on: the one or more first media segments, the media context, and the input;
transmitting the reference segment to at least one remote device;
receiving, from the at least one remote device, the target second media segment based on the reference segment, wherein the target second media segment is recorded using a camera of the at least one remote device;
verifying the target second media segment based on the one or more quality metrics or the storyboard; and
outputting a sequence of media segments from the one or more first media segments and the target second media segment based on the one or more tasks.

2. The computer-implemented method of claim 1, wherein the artificial-intelligence agent technique is configured to convolve one or more space-time kernels.

3. The computer-implemented method of claim 1, further comprising:
generating the sequence of media segments including the media segment and one or more other media segments corresponding to the reference segment.

4. The computer-implemented method of claim 1, wherein the reference segment corresponds to virtual time points that follow time points of the one or more first media segments.

5. The computer-implemented method of claim 1, wherein the one or more first media segments include multiple frames of video data.

6. The computer-implemented method of claim 1, wherein the input that includes the information indicative the target second media segment includes a textual or verbal description of a visual context of the target second media.

7. The computer-implemented method of claim 1, further comprising:

identifying an object or action that is to be included in the one or more first media segments, wherein new content is identified using the identified object or action.

8. A system comprising:

one or more processors; and a computer-readable medium storing instructions that when executed by one or more processors, cause the one or more processors to perform operations including:

accessing a media context that defines media, the media context including an identification of a specification of a first media segment and one or more quality metrics;

accessing one or more first media segments;

receiving an input that includes information indicative of a target second media segment, wherein the information includes at least part of a storyboard specifying one or more tasks for completion by one or more artificial-intelligence agents;

identifying, using an artificial-intelligence agent technique, a reference segment to supplement the first media segment based on: the one or more first media segments, the media context, and the input;

transmitting the reference segment to at least one remote device;

receiving, from the at least one remote device, the target second media segment based on the reference segment, wherein the target second media segment is recorded using a camera of the at least one remote device;

verifying the target second media segment based on the one or more quality metrics or the storyboard; and outputting a sequence of media segments from the one or more first media segments and the target second media segment based on the one or more tasks.

9. The system of claim 8, wherein the artificial-intelligence agent technique is configured to convolve one or more space-time kernels.

10. The system of claim 8, wherein the operations further include:

generating the sequence of media segments including the media segment and one or more other media segments corresponding to the reference segment.

11. The system of claim 8, wherein the reference segment corresponds to virtual time points that follow time points of the one or more first media segments.

12. The system of claim 8, wherein the one or more first media segments include multiple frames of video data.

13. The system of claim 8, wherein the input that includes the information indicative the target second media segment includes a textual or verbal description of a visual context of the target second media.

14. A computer-program product tangibly embodied in a non-transitory machine-readable storage medium, including instructions configured to cause one or more data processors to perform operations including:

accessing a media context that defines media, the media context including an identification of a specification of a first media segment and one or more quality metrics;

accessing one or more first media segments;

receiving an input that includes information indicative of a target second media segment, wherein the information includes at least part of a storyboard specifying one or more tasks for completion by one or more artificial-intelligence agents;

identifying, using an artificial-intelligence agent technique, a reference segment to supplement the first media segment based on: the one or more first media segments, the media context, and the input;

transmitting the reference segment to at least one remote device;

receiving, from the at least one remote device, the target second media segment based on the reference segment, wherein the target second media segment is recorded using a camera of the at least one remote device;

verifying the target second media segment based on the one or more quality metrics or the storyboard; and outputting a sequence of media segments from the one or more first media segments and the target second media segment based on the one or more tasks.

15. The computer-program product of claim 14, wherein the artificial-intelligence agent technique is configured to convolve one or more space-time kernels.

16. The computer-program product of claim 14, wherein the operations further include:

generating the sequence of media segments including the media segment and one or more other media segments corresponding to the reference segment.

17. The computer-program product of claim 14, wherein the reference segment corresponds to virtual time points that follow time points of the one or more first media segments.

18. The computer-program product of claim 14, wherein the one or more first media segments include multiple frames of video data.

19. The computer-program product of claim 14, wherein the input that includes the information indicative the target second media segment includes a textual or verbal description of a visual context of the target second media.

20. The computer-program product of claim 14, wherein the operations further include:

identifying an object or action that is to be included in the one or more first media segments, wherein new content is identified using the identified object or action.

* * * * *